United States Patent
Nakagawa et al.

(10) Patent No.: US 7,989,535 B2
(45) Date of Patent: Aug. 2, 2011

(54) SURFACE-MODIFIED NANOFILLER AND POLYMER COMPOSITE MATERIAL

(75) Inventors: Hideto Nakagawa, Settsu (JP); Haruhiko Mohri, Settsu (JP); Hirokazu Aoyama, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 682 days.

(21) Appl. No.: 11/993,446

(22) PCT Filed: Jun. 22, 2006

(86) PCT No.: PCT/JP2006/312491
§ 371 (c)(1),
(2), (4) Date: Dec. 20, 2007

(87) PCT Pub. No.: WO2006/137475
PCT Pub. Date: Dec. 28, 2006

(65) Prior Publication Data
US 2010/0160503 A1    Jun. 24, 2010

(30) Foreign Application Priority Data

Jun. 24, 2005 (JP) ................................. 2005-185246
Dec. 27, 2005 (JP) ................................. 2005-376093

(51) Int. Cl.
*C08K 3/34* (2006.01)
*C08K 5/02* (2006.01)

(52) U.S. Cl. .................... 524/445; 252/183.13
(58) Field of Classification Search .................. 524/445, 524/495, 496; 252/183.13
See application file for complete search history.

(56) References Cited

U.S. PATENT DOCUMENTS

| | | | |
|---|---|---|---|
| 5,840,796 A | | 11/1998 | Badesha et al. |
| 6,414,069 B1 | | 7/2002 | Pinnavaia et al. |
| 6,472,460 B1 | | 10/2002 | Okamoto et al. |
| 6,734,229 B2 | | 5/2004 | Parsons |
| 6,743,957 B2 | * | 6/2004 | Fuda et al. ............ 570/179 |
| 7,006,780 B2 | * | 2/2006 | Gervasi et al. ........ 399/266 |
| 2002/0143098 A1 | * | 10/2002 | Kawai et al. ............ 524/503 |
| 2003/0068486 A1 | * | 4/2003 | Arney et al. ............ 428/323 |
| 2004/0192822 A1 | * | 9/2004 | Shirai et al. ............ 524/445 |
| 2005/0159540 A1 | * | 7/2005 | Goshiki ................ 524/544 |
| 2005/0261389 A1 | * | 11/2005 | Bratolavsky et al. ...... 522/71 |
| 2006/0084756 A1 | * | 4/2006 | Southwell et al. ........ 524/589 |
| 2006/0116464 A1 | * | 6/2006 | Brunelle et al. .......... 524/444 |
| 2006/0236941 A1 | * | 10/2006 | Herchen ................ 118/728 |
| 2007/0037918 A1 | * | 2/2007 | Keigo .................. 524/495 |
| 2008/0269396 A1 | * | 10/2008 | Karanam et al. ........ 524/445 |
| 2010/0160503 A1 | * | 6/2010 | Nakagawa et al. ....... 524/105 |

FOREIGN PATENT DOCUMENTS

| | | |
|---|---|---|
| CN | 1552739 | 12/2004 |
| JP | 09-087432 A | 3/1997 |
| JP | 10-081785 A | 3/1998 |
| JP | 2000-204214 A | 7/2000 |
| JP | 2001-523278 A | 11/2001 |
| JP | 3284552 B2 | 3/2002 |
| JP | 2004-010891 A | 1/2004 |
| JP | 2005-500409 A | 1/2005 |
| JP | 2005-146081 A | 6/2005 |
| JP | 2005-200272 A | 7/2005 |
| WO | WO-99-50340 | 10/1999 |
| WO | WO-2005-042636 A1 | 5/2005 |

OTHER PUBLICATIONS

43rd Annual Meeting of the Japan Oil Chemists' Society Nov. 1, 2004, p. 156.
Langmuir, Formation of Uniform Fluorinated Gold Nanoparticles and Their Highly Ordered Hexagonally Packed Monolayer, Jan. 29, 2001, 2291-2293, American Chemical Society.

* cited by examiner

*Primary Examiner* — Peter Szekely
(74) *Attorney, Agent, or Firm* — Global IP Counselors

(57) ABSTRACT

A polymer composite material provides superior heat resistance, mechanical physical properties, substance permeation barrier properties, flame retardant properties, electrical conductivity and the like. Moreover, a novel surface-modified nanofiller utilizes this type of polymer composite material. The polymer composite material contains nanofillers, fluorocompounds and polymers. Fluoruocompounds bond to the surface of the nanofillers. The nanofillers to which fluorocompounds are surface-bonded are mixed with or dispersed in polymers.

14 Claims, No Drawings

SURFACE-MODIFIED NANOFILLER AND POLYMER COMPOSITE MATERIAL

BACKGROUND OF THE INVENTION

1. Field of the Invention

The present invention relates to surface-modified nanofillers and polymer composite materials applied to surface-modified nanofillers.

2. Background Information

Conventionally, with the objective of improving the various properties of polymer materials, the method of adding nanofillers such as a clay mineral and the like to polymer materials and the like have been investigated (for example, see Tatsuto YUI et al., 43rd Annual Meeting of the Japan Oil Chemists' Society (JOCS-MPOB Joint Symposium, Collected Lectures, Nov. 1, 2004, p 156); Tetsu YONEZAWA et al., Langmuir 2001 17 2291-2293; JP Patent No. 3284552; Japanese Published Unexamined Patent Application No. H9-87432 (1997); Published Japanese translation of a PCT Application No. 2001-523278; Japanese Published Unexamined Patent Application No. H10-81785 (1998); U.S. Pat. No. 5,840,796; WO 99/50340; Japanese Published Unexamined Patent Application No. 2000-204214; U.S. Pat. No. 6,414,069; U.S. Pat. No. 6,734,229; Japanese Published Unexamined Patent Application No. 2004-10891; Japanese Published Unexamined Patent Application No. 2005-146081; Published Japanese translation of a PCT Application No. 2005-500409; Japanese Published Unexamined Patent Application No. 2005-146081; and Japanese Published Unexamined Patent Application No. 2005-200272). However, further improvements would be desirable, particularly with respect to the substance permeability barrier properties, mechanical physical properties, heat resistance, flame retardant properties and electrical conductivity.

At the same time, various investigations have been carried out with respect to surface modification for nanofillers such as a clay mineral and the like, for example, combinations of fluorinated surfactants that possess fluorinated carbon atoms in the molecules have been reported (for example, see Tatsuto YUI et al., 43$^{rd}$ Annual Meeting of the Japan Oil Chemists' Society (JOCS-MPOB Joint Symposium, Collected Lectures, Nov. 1, 2004, p 156); Tetsu YONEZAWA et al., Langmuir 2001 Vol 17 2291-2293; and Japanese Published Unexamined Patent Application No. 2005-200272).

SUMMARY OF THE INVENTION

Problem to be Solved by the Invention

The object of the present invention is to offer a polymer composite material that provides superior heat resistance, mechanical physical properties, substance permeability barrier properties, flame retardant properties, electrical conductivity and the like. Moreover, another object of the present invention is to offer a novel surface-modified nanofiller that is utilized for this type of polymer composite material.

Means to Solve the Problem

The polymer composite materials that relate to the present invention contain nanofillers, fluorocompounds and polymers. The fluorocompounds bond to the surface of the nanofillers. Furthermore, the term "bond" as used herein includes for example ionic bonds, covalent bonds, coordination bonds, intermolecular forces (dipole-dipole interaction, dispersion forces, hydrogen bonds) and the like.

In addition, in the polymer composite materials that relate to the present invention, a preferred nanofiller is at least one selected from the group consisting of nanocarbon materials, metal heteroatom compounds and metal nanoparticles.

Additionally, in the polymer composite materials that relate to the present invention, a preferred fluorocompound is an organic ion that possesses a fluorine-containing alkyl group of from 1 to 50 carbon atoms that optionally contains heteroatoms.

Moreover, in the polymer composite materials that relate to the present invention, the organic ion has the structure represented by shown in Generic Formula (1) below;

Structure 1

$$L^{1\oplus} - R^1{}_s \qquad (1)$$

(where in the formula, $L^1$ is P, N, S, Si, O, Se, Te, As, Sb, Bi, F, Cl, Br or I; s is a value determined according to the valence of atom $L^1$, and is 2, 3, 4 or 5; $R^1$ can be the same or different and can be any one of a hydrogen atom, an alkyl group that optionally contains heteratoms and that can optionally be substituted in part by fluorine atoms, and a fluorine-containing alkyl group of from 1 to 50 carbon atoms that optionally contains heteroatoms, that can optionally be bonded to each other, but at least one $R^1$ is a fluorine-containing alkyl group of from 1 to 50 carbon atoms that optionally contains heteroatoms); or has the structure represented by Generic Formula (2) shown below;

Structure 2

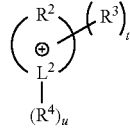

$$\qquad (2)$$

(where in the formula, $L^2$ is P, N, S, Si, O, Se, Te, As, Sb, Bi, F, Cl, Br or I; $R^2$ is an alkylene group that optionally contains heteroatoms and unsaturated bonds and that can optionally be substituted by fluorine atoms, or a chain group that is constituted from atoms other than carbon and that optionally contains unsaturated bonds; t is a number that is less than or equal to the number of atoms that constitute the chain portion of $R^2$; u is a integral number from 0 to 3 that is determined according to the valence of $L^2$; $R^3$ and $R^4$ can be the same or different and can be any one of a hydrogen atom, an alkyl group that optionally contains heteratoms and that can optionally be substituted in part by fluorine atoms, and a fluorine-containing alkyl group of from 1 to 50 carbon atoms that optionally contains heteroatoms, but it is preferable for at least one from among $R^3$ and $R^4$ is a fluorine-containing alkyl group of from 1 to 50 carbon atoms that optionally contains heteroatoms).

In addition, in the polymer composite materials that relate to the present invention, the organic ion is more preferably at least one type of organic ion selected from the group consisting of organic ammonium ions, organic phosphonium ions and nitrogen-containing heterocyclic onium ions.

Additionally, in the polymer composite materials that relate to the present invention, the fluorine-containing alkyl group is preferably of from 4 to 50 carbon atoms.

Moreover, in the polymer composite materials that relate to the present invention, the polymer is preferably a fluorine-containing polymer.

In addition, the molded article that relates to the present invention is formed from polymer composite materials such as those shown above.

The surface-modified nanofiller that relates to the present invention contains nanofillers and fluorocompounds. The fluorocompounds bond to the surface of the nanofillers. Furthermore, the term "bond" as used herein includes for example ionic bonds, covalent bonds, coordination bonds, intermolecular forces (dipole-dipole interaction, dispersion forces, hydrogen bonds) and the like.

Additionally, in the nanofiller in the surface-modified nanofiller that relates to the present invention, the nanofiller is preferably at least one selected from the group consisting of nanocarbon materials, metal heteroatom compounds and metal nanoparticles.

Moreover, as the surface-modified nanofiller that relates to the present invention, surface-modified nanofillers that contain double hydroxides and fluorocompounds that are bonded to the surface of the double hydroxides, as well as surface-modified nanofillers that contain clay minerals and fluorocompounds that are bonded to the surface of the clay minerals (except for organic ammonium compounds), are more preferred.

In addition, in the surface-modified nanofiller that relates to the present invention, the fluorocompound is preferably an organic ion that possesses fluorine-containing alkyl groups with from 1 to 50 carbon atoms optionally including heteroatoms.

Additionally, in the surface-modified nanofiller that relates to the present invention, the organic ion has the structure represented by Generic Formula (1) below:
Structure 3

(where in the formula, $L^1$ is P, N, S, Si, O, Se, Te, As, Sb, Bi, F, Cl, Br or I; s is a value determined according to the valence of atom $L^1$, and is 2, 3, 4 or 5; $R^1$ can be the same or different and can be any one of a hydrogen atom, an alkyl group that optionally contains heteroatoms and that can optionally be substituted in part by fluorine atoms, and a fluorine-containing alkyl group of from 1 to 50 carbon atoms that optionally contains heteroatoms, that can optionally be bonded to each other, but at least one $R^1$ is a fluorine-containing alkyl group of from 1 to 50 carbon atoms that optionally contains heteroatoms; or has the structure represented by Generic Formula (2) shown below;

Structure 4

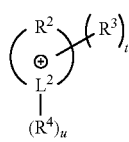

(where in the formula, $L^2$ is P, N, S, Si, O, Se, Te, As, Sb, Bi, F, Cl, Br or I; $R^2$ is an alkylene group that optionally contains heteroatoms and unsaturated bonds and that can optionally be substituted by fluorine atoms, or a chain group that is constituted from atoms other than carbon and that optionally contains unsaturated bonds; t is a number that is less than or equal to the number of atoms that constitute the chain portion of $R^2$; u is a integral number from 0 to 3 that is determined according to the valence of $L^2$; $R^3$ and $R^4$ can be the same or different and preferably are any one of a hydrogen atom, an alkyl group that optionally contains heteroatoms and that can optionally be substituted in part by fluorine atoms, and a fluorine-containing alkyl group of from 1 to 50 carbon atoms that optionally contains heteroatoms, but at least one from among $R^3$ and $R^4$ is a fluorine-containing alkyl group of from 1 to 50 carbon atoms that optionally contains heteroatoms).

Moreover, in the surface-modified nanofiller that relates to the present invention, the organic ion is more preferably at least one from among organic phosphonium ion and nitrogen-containing heterocyclic onium ion.

In addition, in the surface-modified nanofiller that relates to the present invention, the fluorine-containing alkyl group preferably has from 4 to 50 carbon atoms.

Effect of the Invention

The polymer composite material of the present invention offers superior heat resistance, mechanical physical properties, substance permeability barrier properties, flame retardant properties, electrical conductivity and the like.

Additionally, for the partially novel surface-modified nanofiller that relates to the present invention have good compatibility with the polymer, in particular, the fluorine-containing polymer to be uniformly dispersed to be able to offer a superior polymer material with the above characteristics.

DETAILED DESCRIPTION OF THE INVENTION

Surface-Modified Nanofiller

The surface-modified nanofiller that relates to the present invention contains a nanofiller and a fluorocompound that is bonded to the surface of the nanofiller. Furthermore, to the extent that the function and effect of the present invention is not lost, this surface-modified nanofiller can contain other components. Moreover, a surface-modified nanofiller that contains nanofiller and fluorocompounds that are bonded to the surface of the nanofiller can be partially novel compounds.

The nanofiller and the fluorocompounds used for modifying the surface that is contained in the surface-modified nanofiller are specified in detail below.

Nanofiller

Examples of the nanofiller that is used in this embodiment that can be named include nanocarbon materials, metal heteroatom compounds and metal nanoparticles, one or two or more selected from among these can be used in this embodiment. The term "nanofiller" as used here means a filler at least one of which possesses a nano-level (from 0.1 nm to 1000 nm) structure (particle form, sheet form, layer form, needle form, rod form, fiber form, tube form). Each of the above-mentioned nanofillers is specified in detail below.

(A) Nanocarbon Materials

Compounds that are constituted from carbon atoms present in a nano-level structure, specific examples of which are given below.

a) Fullerene

A carbon molecule that is formed from 60 or more carbon atoms and possesses a globular bonded structure.

b) Carbon Nanoballs (Carbon Black)

A powder that is black or black with gray banding that is produced by thermal decomposition when hydrocarbons undergo incomplete combustion.

c) Carbon Nanofibers

These are formed by the thermal decomposition of a carbon source in the gas phase under suitable conditions using a metal catalyst of iron, cobalt or the like. Regarding the structure of the carbon in fiber form, three main types are known for the orientation of the fiber axis of the planar carbon layer, parallel (ribbon type), perpendicular (platelet type), and inclined (herringbone type).

d) Carbon Nanotubes

These are one type of carbon nanofiber. These are a type of fullerene that comes from a network of six-membered rings made from carbon (graphene sheet) in the form of a single layer or multilayer concentric tube. The single layer nanotube is referred to as single-walled nanotubes (SWNT) while the multilayer nanotube is referred to as multi-walled nanotubes (MWNT). In particular, the two-layer nanotube is called double-walled nanotubes (DWNT).

Furthermore, for example these types of nanocarbon materials are described in "Chemical Industry Japan" 2005 vol. 56 pp 50-62 and Langmuir 1995 vol. 11 pp 3682-3866 and the like. Thus, among such carbon nanomaterials, carbon nanofibers are preferred, and furthermore carbon nanotubes are particularly preferred.

(B) Metal Heteroatom Compounds

These are compounds with metals and heteroatoms as the main constituents. Examples of metals that can be named include alkali metals (lithium, sodium, potassium, and the like), alkaline earth metals (calcium, magnesium, barium, and the like), transition metals (titanium, vanadium, niobium, chromium, molybdenum, tungsten, iron, manganese, ruthenium, cobalt, nickel, palladium, platinum, copper, silver, gold, zinc, cadmium, mercury, lanthanide group metals, actinide group metals and the like), main group metal elements (aluminum, silicon, gallium, indium, tin, bismuth, lead and the like). In addition, for the heteroatoms, boron from group 13 of the periodic table, nitrogen, phosphorus and arsenic from group 15 of the periodic table, oxygen, sulfur, selenium, tellurium and the like from group 16 of the periodic table, and fluorine, chlorine, bromine, iodine and the like from group 17 of the periodic table. Furthermore, in this embodiment, the preferred heteroatoms are boron, nitrogen, phosphorus, oxygen and sulfur.

Example of these metal heteroatom compounds that can be named include metal oxide compounds (clay minerals, double hydroxides, perovskite and other metal oxide compounds), metal phosphate salts and metal chalcogenides. Among these, the metal oxide compounds are preferred. Thus, among such metal heteroatom compounds, particularly metal heteroatom compounds that possess a particulate structure, metal heteroatom compounds that possess a layer or sheet structure, or metal heteroatom compounds that possess a needle, rod, fiber or tube structure are preferred. Additionally, among these, the metal heteroatom compounds that possess a layer structure are particularly preferred.

Specific examples of the metal heteroatom compounds that can be named include those found below.

a) Clay Minerals

These clay minerals (referred to below as "clays") are, for example, silicate minerals and the like that possess a layered structure that is formed from multiple sheets being stacked. Here, the sheets that form a layer can be tetrahedra that are formed of silicic acid and are multiply bonded on the planar surface, or can be aluminum- or magnesium-containing octahedral that are multiply bonded on the planar surface. Moreover, these clay minerals can be derived from nature, can be processed products from natural materials, and can be synthetic products such as swellable fluorinated mica.

Specific examples of the abovementioned clay minerals that can be named, without being limiting in any particular way, include montmorillonite, bentonite, kaolinite, imogolite, mica, hectorite, fluorohectorite, saponite, beidellite, nontronite, stevensite, vermiculite, halloysite, volkonskoite, suconite, magadite, kenyalite, and the like, and one or two or more among these can be selected for use in this embodiment.

Among these clay minerals, the sheet form (layer form) clay minerals are preferred. Normally, one layer of the sheet (layer) of the sheet form (layer form) clay mineral has a thickness of several nanometers or less. A sheet (layer) of 2 nm thickness or less is particularly preferred.

b) Double Hydroxides

A double hydroxide is, for example, one of the layered compounds represented by Generic Formula (3) below:

(where in the formula, $M^{II}$ is a divalent metal, $M^{III}$ is a trivalent metal, $A^{n-}$ is an anion that contains an aromatic amino carboxylic acid anion, n is the valence of the aforementioned anion, x is a value between 0 and 0.4, y is a real number greater than 0), that has stacked sheets of hydroxides of divalent and trivalent metals that bear a positive charge. Furthermore, anions that compensate the positive charges in the hydroxide sheet are incorporated into the space between the layers.

In this embodiment, among all of these, in particular the particle form of the double hydroxide, the layer form or sheet form of the double hydroxide, or the needle form, rod form or fiber form of the double hydroxide are preferred, and furthermore the layered double hydroxide is particularly preferred.

c) Perovskite

This is one type of a tetragonal crystal structures. Crystal structures that have the same structure as perovskite are called perovskite structures. For example, transition metal oxides of the $RMO_3$ ternary series such as $BaTiO_3$ (barium titanote) will have the crystal structure. They will ideally have a simple cubic unit cell, and the metal R is positioned at the vertices of the cubical crystal while the metal M has body-centered positioning, and thus the oxygens O will have face-centered positioning in the cubical crystal with the metal M as the center. Furthermore, perovskites include those described in Catalyst (Japan) 2005 vol. 47 pp 290-294 and the like. In this embodiment, among these, in particular the particle form of perovskite, the layer form or sheet form of perovskite, or the needle form, rod form or fiber form of perovskite are preferred, and furthermore the layer form of perovskite is particularly preferred.

d) Other Metal Oxides

Examples of metal oxides other than those from the abovementioned classifications include materials that have a nano-level size and possess a particle form, layer form, sheet form, needle form, rod form, fiber form or tube form structure.

Examples of metal oxides other than those from the abovementioned classifications that can be named include silica, alumina, iron oxides, zinc oxides, zirconia, titania and the like. In addition, for example they include the materials mentioned in Catalyst (Japan) 2005 vol. 47 pp 279-294 and the like.

e) Metal Phosphates

A metal phosphate is, for example, the material shown in Generic Formula (4) below:

(where in the formula, M is Ti, Zr, Ce or Sn) and the materials as shown in Generic Formula (5) below:

(where in the formula, R is H, Rh or Me).

Among all of these, in particular, the particle form of the metal phosphate, the layer form or sheet form of the metal phosphate, or the needle form, rod form or fiber form of the metal phosphate are preferred, and furthermore the layer form of metal phosphate is particularly preferred.

f) Metal Chalcogens (Sulfur, Selenium, Tellurium) Compounds

A metal chalcogen compound is, for example, as represented by Generic Formula (6) below:

$$MX_2 \quad (6)$$

(where in the formula, M is Ti, Zr, Hf, V, Nb, Ta, Mo or W, X is S or Se) and materials represented by Generic Formula (7) below:

$$MPX_3 \quad (7)$$

(where in the formula, M is Mg, V, Mn, Fe, Co, Ni, Zn, Cd or In, and X is S or Se).

(C) Metal Nanoparticles

These are metal particles with a particle diameter of 1 to 100 nanometers (1 nanometer=1,000,000th part of 1 millimeter). The metal constituent of the metal nanoparticles can be one or two or more types selected from the group consisting of Ag, Au, Cu, Pt, Pd, W, Ni, Ta, In, Sn, Zn, Cr, Fe, Co, Si, and the like, or an alloy that includes at least two types from this group, with a suitable selection being made in combination with the objective and the application.

FLUOROCOMPOUNDS FOR USE IN SURFACE MODIFICATION

Examples of fluorocompounds for use in surface modification that are used in this embodiment that can be named include organic cations that possess a fluorine-containing alkyl group of from 1 to 50 carbon atoms that optionally contains heteroatoms, organic anions that possess a fluorine-containing alkyl group of from 1 to 50 carbon atoms that optionally contains heteroatoms, and organic groups that possess a fluorine-containing alkyl group of from 1 to 50 carbon atoms that optionally contains heteroatoms and the like, and it is possible to use one or two or more types selected from among these in this embodiment. Furthermore, these fluorocompounds for use in surface modification are physically or chemically bonded to the surface of the nanofiller.

The abovementioned fluorocompounds for use in surface modification are explained in detail below.

(A) Organic Cations

Organic cations possess a fluorine-containing alkyl group of from 1 to 50 carbon atoms that optionally contains heteroatoms. Preferred organic cations are those that will form an ionic bond to the surface of the nanofiller. Furthermore, either only one type of organic cation can be employed, or two or more can be used in combination.

For the abovementioned organic cations, onium cations are particularly preferred, and among these, preferred structure is represented by Generic Formula (1) below:
Structure 5

$$L^{1\oplus}-R^1{}_s \quad (1)$$

(where in the formula, $L^1$ is P, N, S, Si, O, Se, Te, As, Sb, Bi, F, Cl, Br or I; s is a value determined according to the valence of atom $L^1$ and is 2, 3, 4 or 5; $R^1$ can be the same or different and can be any one of a hydrogen atom, an alkyl group that optionally contains heteratoms and that can optionally be substituted in part by fluorine atoms, and a fluorine-containing alkyl group of from 1 to 50 carbon atoms that optionally contains heteroatoms, that can optionally be bonded to each other, but at least one $R^1$ is a fluorine-containing alkyl group of from 1 to 50 carbon atoms that optionally contains heteroatoms); or the structure represented by Generic Formula (2) shown below;

Structure 6

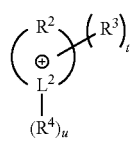

(2)

(where in the formula, $L^2$ is P, N, S, Si, O, Se, Te, As, Sb, Bi, F, Cl, Br or I; $R^2$ is an alkylene group that optionally contains heteroatoms and unsaturated bonds that can optionally be substituted in part by fluorine atoms, or a chain group that is constituted from atoms other than carbon and that optionally contains unsaturated bonds; t is a number that is less than or equal to the number of atoms that constitute the chain portion of $R^2$; u is a integral number from 0 to 3 that is determined according to the valence of $L^2$; $R^3$ and $R^4$ can be the same or different and preferably can be any one of a hydrogen atom, an alkyl group that optionally contains heteratoms and that can optionally be substituted in part by fluorine atoms, and a fluorine-containing alkyl group of from 1 to 50 carbon atoms that optionally contains heteroatoms, but at least one from among $R^3$ and $R^4$ is a fluorine-containing alkyl group of from 1 to 50 carbon atoms that optionally contains heteroatoms). With materials that possess such structures, it furthermore becomes possible to impart superior heat resistance to the polymer composite materials that relate to the present invention. Furthermore, the onium cations $FH^+$—$R^1s$ or $ClH$—$R^1s$, $BrH^+$—$R^1s$, $IH^+$—$R^1s$, $OH_2{}^+$—$R^1s$, $SH_2{}^+$—$R^1s$, $SeH_2{}^+$—$R^1s$, $TeH_2{}^+$—$R^1s$, $NH_3$—$R^1s$, $PH_3{}^+$—$R^1s$, $SbH_3{}^+$—$R^1s$, $BiH_3{}^+$—$R^1s$ or the like are also included in Generic Formula (1).

For the organic cation presents in the structure represented by the abovementioned Generic Formula (1), preferred examples are as represented in Generic Formula (8) below;

Structure 7

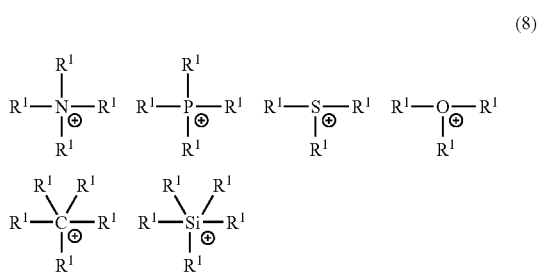

(8)

(where in the formulas, $R^1$ is the same as the $R^1$ in the abovementioned Generic Formula (1)).

In addition, for the organic cation presents in the structure represented by generic Formula (2), preferred examples are as represented in Generic Formula (9) below;

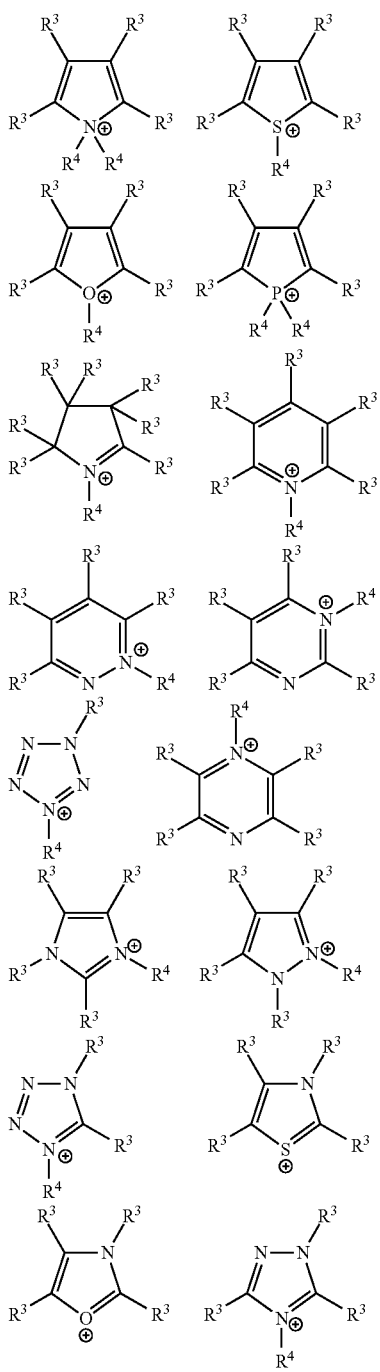

Structure 8

(9)

(where in the formulas, $R^3$ and $R^4$ are the same as the $R^3$ and $R^4$ in the abovementioned Generic Formula (2)).

In the present invention, among the abovementioned organic cations, the ones with the $L^1$ and $L^2$ in the abovementioned Generic Formula (1) and Generic Formula (2) being P (phosphorus atom) or N (nitrogen atom) are preferred. More preferred are the phosphonium ions with $L^1$ and $L^2$ being P, or the onium ion with $L^2$ being N and $L^2$ together with $R^2$ constituting a heterocyclic ring or homocyclic N ring. Specifically, the abovementioned organic ions are preferably at least one from among phosphonium ion, nitrogen-containing heterocyclic onium ion and nitrogen homocyclic onium ion. By having the abovementioned organic ions be at least one from among phosphonium ion, nitrogen-containing heterocyclic onium ion and nitrogen homocyclic onium ion, it becomes possible to impart a more markedly superior heat resistance. Furthermore, the nitrogen-containing heterocyclic onium ion is an onium ion that possesses a heterocyclic ring that includes nitrogen.

Preferred examples of the abovementioned phosphonium ions are as represented in Generic Formula (10) below:

Structure 9

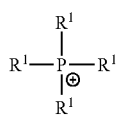

(10)

(where in the formula, $R^1$ is the same as the $R^1$ in the abovementioned Generic Formula (1)). More specifically, examples that can be named include perfluoroethylphosphonium ions, perfluoropropylphosphonium ions, perfluorobutylphosphonium ions, perfluorobutylethylphosphonium ions, perfluorohexylphosphonium ions, perfluorohexylethylphosphonium ions, perfluoroheptylphosphonium ions, perfluorooctylphosphonium ions, perfluorooctylethylphosphonium ions, perfluorodecylphosphonium ions, perfluorodecylethylphosphonium ions and the like.

Preferred examples of the abovementioned nitrogen-containing heterocyclic onium ions are as represented Generic Formula (11) below:

Structure 10

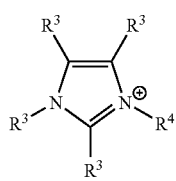

(11)

(where in the formulas, $R^3$ and $R^4$ are the same as the $R^3$ and $R^4$ in the abovementioned Generic Formula (2)). More specifically, examples that can be named include imidazolium ions such as perfluoroethylimidazolium ions, perfluoropropylimidazolium ions, perfluorobutylimidazolium ions, perfluorobutylethylimidazolium ions, perfluorohexylimidazolium ions, perfluorohexylethylimidazolium ions, perfluoroheptylimidazolium ions, perfluorooctylimidazolium ions, perfluorooctylethylimidazolium ions, perfluorodecylimidazolium ions, perfluorodecylethylimidazolium ions and the like, or pyridinium ions such as perfluoroethylpyridinium ions, perfluoropropylpyridinium ions, perfluorobutylpyridinium ions, perfluorobutylethylpyridinium ions, perfluorohexylpyridinium ions, perfluorohexylethylpyridinium ions, perfluoroheptylpyridinium ions, perfluorooctylpyridinium ions, perfluorooctylethylpyridinium ions, perfluorodecylpyridinium ions, perfluorodecylethylpyridinium ions and the like.

Furthermore, in the polymer composite materials that relate to the present invention, the abovementioned organic ions can also be organic ammonium ions such as perfluoroethylammonium ions, perfluoropropylammonium ions, perfluorobutylammonium ions, perfluorobutylethylammonium ions, perfluorohexylammonium ions, perfluorohexylethylammonium ions, perfluoroheptylammonium ions, perfluorooctylammonium ions, perfluorooctylethylammonium ions, perfluorodecylammonium ions, perfluorodecylethylammonium ions and the like.

Additionally, for the fluorine-containing alkyl group of from 1 to 50 carbon atoms, for the cation site side, —$(CH_2)_n$— (where n is 1 or 2) is preferred among the abovementioned alkyl groups. More specifically, preferred examples of the abovementioned organic cations are present in the structure as represented by Generic Formula (12) below:

Structure 11

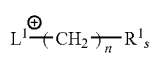
(12)

(where in the formula, $L^1$ and s are the same as the $L^1$ and s in Generic Formula (1). n is 1 or 2. —$(CH_2)_n$—R' is the same as $R^1$ in Generic Formula (1)).

Examples of combinations with organic cations as suitable nanofillers that can be named include those with clay minerals, perovskite, metal phosphates and the like.

(B) Organic Anions

Organic anions possess a fluorine-containing alkyl group of from 1 to 50 carbon atoms that optionally contains heteroatoms. Preferred organic anions are those that will form an ionic bond to the surface of the nanofiller. Furthermore, either only one type of organic anion can be employed, or two or more can be used in combination.

Examples of suitable organic anions are those represented by $RfCOO^-$, $RfO^-$ and $RfSO_3^-$. More specifically, examples of preferred Rf groups that can be named include perfluoroethyl, perfluoropropyl, perfluorobutyl, perfluorobutylethyl, perfluorohexyl, perfluorohexylethyl, perfluoroheptyl, perfluorooctyl, perfluorooctylethyl, perfluorodecyl, perfluorodecylethyl and the like.

Furthermore, examples of combinations with organic anions as suitable nanofillers that can be named include those with double hydroxides and the like.

(C) Organic Groups

Organic groups possess a fluorine-containing alkyl group of from 1 to 50 carbon atoms that optionally contains heteroatoms. Preferred organic groups are those that form covalent bonds with the surface of nanofillers. Furthermore, either only one type of organic group can be employed, or two or more can be used in combination.

Examples of suitable organic anions are those represented by Rf—, RfS—, RfO—, RfSi—, RfCOO— and RfCONH—. Furthermore, organic groups represented by Rf that do not contain bonding sites for heteroatoms are even more preferred. More specifically, examples of preferred Rf groups that can be named include perfluoroethyl, perfluoropropyl, perfluorobutyl, perfluorobutylethyl, perfluorohexyl, perfluorohexylethyl, perfluoroheptyl, perfluorooctyl, perfluorooctylethyl, perfluorodecyl, perfluorodecylethyl and the like.

Furthermore, examples of combinations with organic groups as suitable nanofillers that can be named include those with nanocarbon materials, metal chalcogenide compounds and the like.

Thus, for the organic ions (organic cations and organic anions) described above, the fluorine-containing alkyl group of from 1 to 50 carbon atoms that optionally contains heteroatoms in the organic group can have a straight chain form, or can possess a branched chain or a cyclic structure. Among the abovementioned fluorine-containing alkyl groups with from 1 to 50 carbon atoms, in particular the fluorine-containing alkyl groups with from 4 to 50 carbon atoms are preferred. Alkyl groups with fewer than 4 carbon atoms would have insufficient dispersibility with respect to polymers. Thus, if the fluorine-containing alkyl group has from 4 to 50 carbon atoms, the compatibility with polymers, in particular, with fluorine-containing polymers will be further increased, and it is possible to obtain a polymer composite material in which the nanofiller is uniformly dispersed within the polymer. Furthermore, for the organic ions (organic cations and organic anions), the organic groups can have fluorine-containing alkyl groups with from 1 to 50 carbon atoms, only one and two or more.

Moreover, for the abovementioned organic ions (organic cations and organic anions), organic group, it is satisfactory to possess a functional group, and such a mode is also one of the preferred modes. If a functional group is introduced into the abovementioned organic ions (organic cations and organic anions), the organic group, it is possible further to increase the polymer compatibility, and it is possible to obtain a more superior polymer composite material with respect to various properties. Examples of preferred functional groups that can be named, without being limiting in any particular way, include the $CO_2H$ group, $NH_2$ group, OH group, $P(OH)_3$ group, $SO_3H$ group, CN group, halogen group (for example, I, Br, Cl) and the like. Furthermore, when the abovementioned organic ions (organic cations and organic anions), the organic group possess halogens, they are mixed with the polymer and co-crosslink the polymer to obtain the polymer composite material, the function and effect of the present invention is further suitably realized. In addition, for the organic ions (organic cations and organic anions), the organic group, it is satisfactory to possess one type of functional group, and it is also satisfactory to possess two or more types of functional group.

Mixing Ratios Between the Nanofiller and the Fluorocompound Used for Surface Modification In the abovementioned surface-modified nanofiller, if the mixing ratio for the nanofiller and the fluorocompound used for surface modification is set arbitrarily depending on the types of fluorocompound used for surface modification and the like, without being limiting in any particular way, then with the total amount of nanofiller and the fluorocompound used for surface modification is 100 mass %, it is preferable to have from 5 to 50 mass % of the fluorocompound used for surface modification.

Manufacturing Methods for Surface-Modified Nanofillers (A) When Organic Ions (Organic Cations and Organic Anions) are Employed as Fluorocompounds Used for Surface Modification An example of a method for manufacturing when organic ions are employed as fluorocompounds used for surface modification that can be named, to the extent that nanofillers and nanofiller-modifying organic ions are included without being limiting in any particular way, is the method where the nanofiller is dispersed in a solvent such as hot water or the like, after which a solution of the organic ion is added to generate a precipitate, then the precipitate obtained is filtered and washed with water, and is then dried to obtain a nanofiller that is surface-modified with a fluorocompound used for surface modification. Furthermore, this method is particularly effective when the nanofiller is a clay mineral or a double hydroxide.

(B) When Organic Groups are Employed as Fluorocompounds Used for Surface Modification A preferred method for manufacturing a surface-modified nanofiller when organic groups are employed as fluorocompounds used for surface modification, to the extent that nanofillers and nanofiller-modifying organic groups are included without being limiting in any particular way, is the method where the preferred nanofiller-modifying organic group represented as Rf that does not include bonding sites for heteroatoms is used. An example of a method is where an organic group-containing compound is dissolved in a suitable solvent, after which a nanofiller is added and the resulting mixture is stirred under an argon atmosphere and is irradiated with a low pressure mercury lamp, after which the solvent is removed, the residue is washed and dried to obtain the surface-modified nanofiller. Furthermore, this method is particularly effective when the nanofiller is a nanocarbon material.

Identification Methods for Surface-Modified Nanofillers (A) When Nanocarbon Materials are Employed as the Nanofiller Normal methods can be adopted as the identification methods, including for example the thermal analysis method, XRD method, elemental analysis, IR, UV and the like. In thermal analysis, it is possible to confirm the production of surface-modified nanofillers by the reduction in mass of the organic moieties (for example, alkyl groups); in the XRD method, it is possible to confirm the production of surface-modified nanofillers by confirming that the interlayer distance of the nanocarbon material is spread out more than the pre-modified interlayer distance. Furthermore, in the thermal analysis, for example, a TG/DTA 6200 (Seiko Electric Co.) can be used; in the XRD method, for example, a model RAD-RA instrument (Rigaku Electric Co.) can be used; in the elemental analysis method, for example, a JM-10 (J-Science) can be used; in the IR method, for example, a model 1760 instrument (Perkin-Elmer) can be used; in the UV method, for example, a U-3310 (Hitachi Co.) can be used.

(B) When Clay Minerals are Employed as the Nanofiller

Normal methods can be adopted as the identification methods, including for example the method using water, the thermal analysis method, the XRD method and the like. In the method using water, it is possible to confirm the production of surface-modified nanofillers by precipitating the surface-modified nanofiller (organically-modified clay mineral) that is not swollen by water; in the thermal analysis method, it is possible to confirm the production of surface-modified nanofillers by the reduction in mass of the organic moieties (for example, alkyl groups) of the organic ions; in the XRD method, it is possible to confirm the production of surface-modified nanofillers by confirming that the interlayer distance of the clay mineral is spread out more than the pre-modified interlayer distance. Furthermore, in the thermal analysis, for example, a TG/DTA 6200 (Seiko Electric Co.) can be used; in the XRD method, for example, a model RAD-RA instrument (Rigaku Electric Co.) can be used.

(C) When Double Hydroxides are Employed as the Nanofiller

Normal methods can be adopted as the identification methods, including for example the method using water, the thermal analysis method, the XRD method, and the like. In the method using water, it is possible to confirm the production of surface-modified nanofillers by precipitating the surface-modified nanofiller (organically-modified double hydroxide) that is not swollen by water; in the thermal analysis method, it is possible to confirm the production of surface-modified nanofillers by the reduction in mass of the organic moieties (for example, alkyl groups) of the organic ions; in the XRD method, it is possible to confirm the production of surface-modified nanofillers by confirming that the interlayer distance of the double hydroxide is spread out more than the pre-modified interlayer distance. Furthermore, in the thermal analysis, for example, a TG/DTA 6200 (Seiko Electric Co.) can be used; in the XRD method, for example, a model RAD-RA instrument (Rigaku Electric Co.) can be used.

(D) When Perovskites are Employed as the Nanofiller

Normal methods can be adopted as the identification methods, including for example the thermal analysis method, XRD method, elemental analysis, IR, UV and the like. In thermal analysis, it is possible to confirm the production of surface-modified nanofillers by the reduction in mass of the organic moieties (for example, alkyl groups); in the XRD method, it is possible to confirm the production of surface-modified nanofillers by confirming that the interlayer distance of the perovskite is spread out more than the pre-modified interlayer distance. Furthermore, in the thermal analysis, for example, a TG/DTA 6200 (Seiko Electric Co.) can be used; in the XRD method, for example, a model RAD-RA instrument (Rigaku Electric Co.) can be used; in the elemental analysis method, for example, a JM-10 (J-Science) can be used; in the IR method, for example, a model 1760 instrument (Perkin-Elmer) can be used; in the UV method, for example, a U-3310 (Hitachi Co.) can be used.

(E) When Other Metal Oxides are Employed as the Nanofiller

Normal methods can be adopted as the identification methods, including for example the thermal analysis method, XRD method, elemental analysis, IR, UV and the like. In thermal analysis, it is possible to confirm the production of surface-modified nanofillers by the reduction in mass of the organic moieties (for example, alkyl groups), in the XRD method, it is possible to confirm the production of surface-modified nanofillers by confirming that the interlayer distance of the metal oxide is spread out more than the pre-modified interlayer distance. Furthermore, in the thermal analysis, for example, a TG/DTA 6200 (Seiko Electric Co.) can be used; in the XRD method, for example, a model RAD-RA instrument (Rigaku Electric Co.) can be used; in the elemental analysis method, for example, a JM-10 (J-Science) can be used; in the IR method, for example, a model 1760 instrument (Perkin-Elmer) can be used; in the UV method, for example, a U-3310 (Hitachi Co.) can be used.

(F) When Metal Phosphates are Employed as the Nanofiller

Normal methods can be adopted as the identification methods, including for example the thermal analysis method, XRD method, elemental analysis, IR, UV and the like. In thermal analysis, it is possible to confirm the production of surface-modified nanofillers by the reduction in mass of the organic moieties (for example, alkyl groups), in the XRD method, it is possible to confirm the production of surface-modified nanofillers by confirming that the interlayer distance of the metal phosphate is spread out more than the pre-modified interlayer distance. Furthermore, in the thermal analysis, for example, a TG/DTA 6200 (Seiko Electric Co.) can be used; in the XRD method, for example, a model RAD-RA instrument (Rigaku Electric Co.) can be used; in the elemental analysis method, for example, a JM-10 (J-Science) can be used; in the IR method, for example, a model 1760 instrument (Perkin-Elmer) can be used; in the UV method, for example, a U-3310 (Hitachi Co.) can be used.

(G) When Metal Chalcogenide Compounds are Employed as the Nanofiller

Normal methods can be adopted as the identification methods, including for example the thermal analysis method, XRD method, elemental analysis, IR, UV and the like. In thermal analysis, it is possible to confirm the production of surface-modified nanofillers by the reduction in mass of the organic moieties (for example, alkyl groups), in the XRD method, it is possible to confirm the production of surface-modified nanofillers by confirming that the interlayer distance of the metal chalcogenide compound is spread out more than the pre-modified interlayer distance. Furthermore, in the thermal analysis, for example, a TG/DTA 6200 (Seiko Electric Co.) can be used; in the XRD method, for example, a model RAD-RA instrument (Rigaku Electric Co.) can be used; in the elemental analysis method, for example, a JM-10 (J-Science) can be used; in the IR method, for example, a model 1760 instrument (Perkin-Elmer) can be used; in the UV method, for example, a U-3310 (Hitachi Co.) can be used.

(H) When Metal Nanoparticles are Employed as the Nanofiller

Normal methods can be adopted as the identification methods, including for example the thermal analysis method, elemental analysis, IR, UV and the like. In thermal analysis, it is possible to confirm the production of surface-modified nanofillers by the reduction in mass of the organic moieties (for example, alkyl groups). Furthermore, in the thermal analysis, for example, a TG/DTA 6200 (Seiko Electric Co.) can be used; in the elemental analysis method, for example, a JM-10 (J-Science) can be used; in the IR method, for example, a model 1760 instrument (Perkin-Elmer) can be used; in the UV method, for example, a U-3310 (Hitachi Co.) can be used.

Polymer Composite Materials

Polymer composite materials that relate to the present invention include surface-modified nanofillers and polymers. As explained in detail before, surface-modified nanofillers contain nanofillers and fluorocompounds for use in surface modification. Furthermore, it is satisfactory to use one type of surface-modified nanofiller and polymer, respectively, and it is also satisfactory to use two or more types. Additionally, it is satisfactory for the polymer composite material that relates to the present invention to include other additives, to the extent that the function and effect of the present invention are not lost.

(A) Polymers

It is satisfactory for the polymer to be a homopolymer and it is also satisfactory for the polymer to be a copolymer. Moreover, examples of monomers that can be named as the raw material for such polymers, without being limiting in any particular way, include fluorine-containing monomers such as tetrafluoroethylene (TFE), hexafluoropropylene (HFP), trifluoroethylene (TrFE), difluoroethylene (VdF) and the like, and non-fluorine-containing monomers such as monomers that possess a double bond such as ethylene, propylene, butylene, pentene, hexane, styrene and the like, or monomers that possess a triple bond such as acetylene or propyne and the like. Furthermore, in the polymerization of these polymers, it is satisfactory to use one type of monomer, and it is also satisfactory to use two or more types of monomer.

Examples of the polymers that are obtained from such monomers that can be named include common polymers such as fluorine-containing polymers (fluorine atom-containing polymers), polystyrene (PS), polypropylene (PP), polyethylene (PE), poly(ethylene oxide) (PEO), poly(ethylene terephthalate) (PET), silicone polymers and the like.

In addition, it is preferable for the abovementioned polymers to possess functional groups. Due to the fact that the polymers possess functional groups, compatibility with surface-modified nanofillers can be increased, and it is possible to obtain polymer composite materials that are more superior with respect to various properties. Examples of preferred functional groups that can be named, without being limiting in any particular way, include the $CO_2H$ group, $NH_2$ group, OH group, $P(OH)_3$ group, $SO_3H$ group, CN group, halogen group (for example, I, Br, Cl) and the like. Furthermore, it is satisfactory for the polymer to possess one type of functional group, and it is also satisfactory for it to possess two or more types of functional group.

Additionally, for the abovementioned polymers, through the appropriate changes in the monomer composition and the polymerization method, the polymer can be crystalline and it can also be amorphous, and the molecular chains can possess crystalline portions and amorphous portions, and the polymer can also be a thermoplastic elastomer.

The abovementioned polymer is more preferably a fluorine-containing polymer. Due to the polymer being a fluorine-containing polymer, it is possible to obtain more superior polymer composite materials with respect to various properties, such as compatibility, mechanical properties, substance permeability barrier properties, and the like.

Furthermore, it is satisfactory if the abovementioned fluorine-containing polymers are homopolymers, it is satisfactory if the abovementioned fluorine-containing polymers are copolymers, and it is also satisfactory if the copolymers are polymers copolymerized with fluorine-containing monomers and other non-fluorine-containing monomers. Furthermore, for the fluorine-containing monomers, it is preferable for monomers that partly include fluorine atoms such as difluoroethylene and that include carbon atoms not bonded to fluorine atoms to be polymerized.

For the abovementioned fluorine-containing polymers, it is preferable for the polymers to possess reactive functional groups on at least one of the main chain terminal ends and the side chain terminal ends.

Examples of reactive functional groups that can be named include halogen groups (for example, I, Br, Cl) and the like), carboxyl group, carboxylic anhydride groups, carbonyldioxy groups, haloformyl groups, hydroxyl groups, isocyanate groups, alkoxycarbonyl groups, epoxy groups and/or amino groups, and the like.

The carbonyldioxy group is a group that possesses the structure represented by —O—C(=O)—O—, and more specifically includes groups such as those depicted by Generic Formula (13):

(where in the formula, $R^5$ is an alkyl group of from 1 to 20 carbon atoms that optionally contains ether bond-type oxygen atoms or Group 17 elements). Examples of the groups depicted in Generic Formula (13) that can be name include —O—C(=O)—OCH$_3$, —O—C(=O)—OC$_3$H$_7$, —O—C(=O)—OC$_8$H$_{17}$, —O—C(=O)—OCH$_2$CH$_2$CH$_2$OCH$_2$CH$_3$ and the like.

The haloformyl groups that can be named include is a group that possesses the structure represented by —C(=O)—X$^1$, where X$^1$ is a fluorine atom, chlorine atom or the like.

Among the reactive functional groups, those preferred from the perspective of heat resistance and mechanical properties are the carbonyl-containing groups such as the carboxyl group, the carboxylic anhydride group, the carbonyldioxy group, the haloformyl group, the isocyanate group, the alkoxycarbonyl group, and the like, and among these the carbonyl-containing groups and in particular the carbonyldioxy group and the haloformyl group are more preferred.

Examples of the methods by which the abovementioned reaction functional groups are introduced onto the main-chain terminal end and/or onto the side-chain terminal end of the fluorine-containing polymer that can be named include the method of copolymerization with a monomer that possesses an aforementioned reactive functional site or a site that can be converted into the reactive functional site during the polymerization of the fluorine-containing polymer, or the method that uses a polymerization initiator that possesses an aforementioned reactive functional site or a site that can be converted into the reactive functional site, but from the perspective that a fluorine-containing polymer that possesses the aforementioned functional site on a main-chain terminal end will be comparatively superior to a fluorine-containing polymer that possesses the aforementioned functional site on a side-chain terminal end with respect to heat resistance, mechanical properties and chemical resistance, and from the perspective of being more advantageous in terms of productivity and costs, the latter method is preferred.

Moreover, examples of methods for the introduction of haloformyl groups into fluorine-containing polymers that can be named include the thermal decomposition (decarboxylation) of the terminal end of a fluorine-containing polymer that possesses a carbonyldioxy group or an ester group on the terminal end. For the heating temperature in this case, depending on the different types of carbonyldioxy group or ester group and the type of fluorine-containing polymer, it is preferable to heat the polymer itself to $\geq 200°$ C., more preferably to $\geq 220°$ C. and particularly preferably to $\geq 230°$ C., and it is preferable for the upper limit for the heating temperature to be at or below the thermal decomposition temperature of the sites other than the carbonyldioxy group or ester group of the fluorine-containing polymer, specifically $\leq 400°$ C., and more preferably $\leq 350°$ C.

For every $1 \times 10^6$ main-chain carbon atoms, it is preferable to have from 3 to 1000, more preferable to have from 3 to 500, and even more preferable to have from 10 to 300 reactive functional groups in the fluorine-containing polymer. For every $1 \times 10^6$ main-chain carbon atoms of the fluorine-containing polymer, there is a tendency for fewer than 3 reactive functional groups not to react sufficiently for a surface-modified nanofiller.

The fluorine-containing polymer of the present invention is preferably a fluororesin or a fluororubber that is formed from at least one type of fluorine-containing ethylenic polymer, and this fluorine-containing ethylenic polymer can be any desired fluorine-containing ethylenic polymer that possesses structural units derived from at least one type fluorine-containing ethylenic monomer. Furthermore, there is no particular limitation with regard to the main-chain and/or side-chain structure of this fluorine-containing polymer. In addition, the abovementioned fluororesin or fluororubber that is formed from the fluorine-containing ethylenic polymer is preferably a polymer that possesses reactive functional groups on the main-chain terminal end and the side-chain terminal end. Examples of reactive functional groups that can be named include halogen groups (for example I, Br. Cl), carboxyl group, carboxylic anhydride groups, carbonyldioxy groups, haloformyl groups, hydroxyl groups, isocyanate groups, alkoxycarbonyl groups, epoxy groups and/or amino groups, and the like.

Specific Examples of Fluororesins)

Examples of fluorine-containing ethylenic monomers that can be named include perfluoroolefin such as tetrafluoroethylene, perfluoroethylenic unsaturated compounds such as represented by Generic Formula (14):

$$CF_2=CF-Rf^1 \quad (14)$$

(where in the formula, $Rf^1$ is $—CF_3$ or $—ORf^2$, and $Rf^2$ is a perfluoroalkyl group of from 1 to 5 carbon atoms), chlorotrifluoroethylene, trifluoroethylene, hexafluoroisobutene, vinylidene fluoride, vinyl fluoride, and fluoroolefins such as represented by Generic Formula (15):

$$CH_2=CX^2(CF_2)_nX^3 \quad (15)$$

(where in the formula, $X^2$ is a hydrogen atom or a fluorine atom, $X^3$ is a hydrogen atom, fluorine atom or a chlorine atom, and n is an integer from 1 to 10).

Thus, it is satisfactory for fluorine-containing ethylenic polymers to possess structural units derived from monomer copolymerizable with the abovementioned fluorine-containing ethylenic monomers, and examples of such monomers that can be named include the abovementioned fluoroolefins and non-fluorinated ethylenic monomers other than perfluoroolefins. Examples of non-fluorinated ethylenic monomers that can be named include ethylene, propylene or alkyl vinyl ethers and the like. Here, the alkyl vinyl ethers possess alkyl groups of from 1 to 5 carbon atoms.

Any one among these is preferred, such as (a) Ethylene-tetrafluoroethylene copolymer (ETFE) formed from tetrafluoroethylene and ethylene;

(b) Tetrafluoroethylene-perfluoro(alkyl vinyl ether) copolymer (PFA) formed from tetrafluoroethylene and perfluoroethylenic unsaturated compounds such as those represented by Generic Formula (16):

$$CF_2=CF-Rf^1 \quad (16)$$

(where in the formula, $R_f^1$ is $—CF_3$ or $—OR_f^2$, and $R_f^2$ is a perfluoroalkyl group of from 1 to 5 carbon atoms), tetrafluoroethylene-hexafluoropropylene copolymer (FEP), or tetrafluoroethylene-hexafluoropropylene-perfluoro(alkyl vinyl ether) copolymer;

(c) Ethylene-trifluoroethylene-perfluoro(alkyl vinyl ether) copolymer (Et-TFE-PAVE copolymer) formed from tetrafluoroethylene, ethylene, and perfluoroethylenic unsaturated compounds represented by Generic Formula (17):

$$CF_2=CF-R_f^1 \quad (17)$$

(where in the formula, $R_f^1$ is $—CF_3$ or $—OR_f^2$, and $R_f^2$ is a perfluoroalkyl group of from 1 to 5 carbon atoms) or ethylene-trifluoroethylene-hexafluoropropylene copolymer (EFEP); and, (d) Poly(vinylidene fluoride) (PVDF).

Next, the preferred fluorine-containing ethylenic polymers from (a) to (d) are explained, respectively.

(a) ETFE

The fluorine-containing ethylenic polymer ETFE is preferred from the perspective that it can provide a polymer composite material with low fuel permeability and flexibility. The mole ratio for the contained tetrafluoroethylene monomer and the ethylene monomer is preferably from 20:80 to 90:10, more preferably from 62:38 to 90:10, and particularly preferably from 63:37 to 80:20. Additionally, it is satisfactory for this ETFE to contain a third component. The third component can be any component that is copolymerizable with tetrafluoroethylene and ethylene, and there is no limitation as to its type. Usually, for the third component, a monomer as represented by Generic Formulas (18)-(21) below:

$$CX^4_2=CX^4R_f^3 \quad (18),$$

$$CX^4_2=CFR_f^3 \quad (19),$$

$$CX^4_2=CFOR_f^3 \quad (20),$$

$$CX^4_2=C(R_f^3)_2 \quad (21)$$

(where in the formula, $X^4$ is a hydrogen atom or a fluorine atom, and $R_f^3$ is a fluoroalkyl group) is used, and among these, the fluorine-containing vinyl monomer represented by Generic Formula (18) is more preferred, and a monomer with $R_f^3$ of from 1 to 8 carbon atoms is particularly preferred.

Specific examples of the fluorine-containing vinyl monomers represented by Generic Formulas (18)-(21) that can be named include 1,1-dihydroperfluoropropene-1; 1,1-dihydroperfluorobutene-1; 1,1,7-trihydroperfluoroheptene-1; 1,1,2-trihydroperfluorohexene-1; 1,1,2-trihydroperfluorooctene-1; 2,2,3,3,4,4,5,5-octafluoropentyl vinyl ether; perfluoro(methyl vinyl ether); perfluoro(propyl vinyl ether); hexafluoropropene, perfluorobutene-1; 3,3,3-trifluoro-2-trifluoromethylpropene-1; 2,3,3,4,4,5,5-heptafluoro-1-pentene ($CH_2=CFCF_2CF_2CF_2H$).

The content of the third component is preferably 0.1-10 mol % with respect to the fluorine-containing ethylenic polymer, is more preferably 0.1-5 mol %, and particularly preferably 0.2-4 mol %.

(b) PFA or FEP

The fluorine-containing ethylenic polymer PFA or FEP is especially preferable from the perspective that it can impart superior heat resistance and substance permeability barrier properties to a polymer composite material. Furthermore, in this case, it is more preferable for the fluorine-containing ethylenic polymer to be formed from 90 to 99 mol % of tetrafluoroethylene monomer and from 1 to 10 mol % of a perfluoroethylenic unsaturated compound monomer as represented in Generic Formula (16). Moreover, it is satisfactory for the fluorine-containing ethylenic polymer that is formed from tetrafluoroethylene and a perfluoroethylenic unsaturated compound monomer as represented in Generic Formula (16) to include a third component. It is satisfactory for the third component to be copolymerizable with tetrafluoroethylene and a perfluoroethylenic unsaturated compound monomer as represented in Generic Formula (16), and there is no limitation as to its type.

(c) Et-TFE-PAVE Copolymer or EFEP

The fluorine-containing ethylenic polymer that is Et-TFE-PAVE copolymer or EFEP is preferred from the perspective that it can impart superior substance permeability barrier properties and flexibility to a polymer composite material. Furthermore, in this case, it is more preferable for the fluorine-containing ethylenic polymer to be formed from 19 to 90 mol % of tetrafluoroethylene monomer, from 9 to 80 mol % of ethylene monomer, and from 1 to 72 mol % of a perfluoroethylenic unsaturated compound monomer as represented in Generic Formula (17). In addition, it is even more preferable for the fluorine-containing ethylenic polymer to be formed from 20 to 70 mol % of tetrafluoroethylene monomer, from 20 to 60 mol % of ethylene monomer, and from 1 to 60 mol % of a perfluoroethylenic unsaturated compound monomer as represented in Generic Formula (17).

Additionally, for the fluorine-containing ethylenic polymer (a) that is formed from tetrafluoroethylene, ethylene, and a perfluoroethylenic unsaturated compound as represented in Generic Formula (17), it is satisfactory to include an additional component. An example of an additional compound that can be named includes 2,3,3,4,4,5,5-heptafluoro-1-pentene ($CH_2=CFCF_2CF_2CF_2H$) and the like. Furthermore, it is satisfactory if the content of the additional compound with respect to the fluorine-containing ethylenic polymer is from 0.1 to 3 mol %.

(d) PVDF

The fluorine-containing ethylenic polymer that is PVDF is preferred from the perspective of being able to impart superior flexibility and mechanical properties to a polymer composite material.

Specific Examples of Fluororubbers

Examples of the abovementioned fluororubbers that are preferred include VdF/HFP copolymer, VdF/HFP/TFE copolymer, VdF/CTFE copolymer, VdF/CTFE/TFE copolymer, VdF/PAVE copolymer, VdF/TFE/PAVE copolymer, VdF/HFP/PAVE copolymer, VdF/HFP/TFE/PAVE copolymer, VdF/TFE/Pr copolymer, VdF/Et/HFP copolymer, VdF/Et/HFP copolymer and the like. Furthermore, more preferred examples are those that possess TFE, HFP, and/or PAVE as the other monomer, and VdF/HFP copolymer, VdF/HFP/TFE copolymer, VdF/PAVE copolymer, VdF/TFE/PAVE copolymer, VdF/HFP/PAVE copolymer and VdF/HFP/TFE/PAVE copolymer are particularly preferred.

For the abovementioned VdF/HFP copolymer, the VdF/HFP composition is preferably 45-85/55-15 mol %, more preferably 50-80/50-20 mol %, and even more preferably 60-80/40-20 mol %.

For the abovementioned VdF/HFP/TFE copolymer, the VdF/HFP/TFE composition is preferably 30-80/35-20/35-0 mol %.

For the abovementioned VdF/PAVE copolymer, the VdF/PAVE composition is preferably 65-90/10-35 mol %.

For the abovementioned VdF/TFE/PAVE copolymer, the VdF/TFE/PAVE composition is preferably 40-80/3-40/15-35 mol %.

For the abovementioned VdF/HFP/PAVE copolymer, the VdF/HFP/PAVE composition is preferably 65-90/3-25/3-25 mol %.

For the abovementioned VdF/HFP/TFE/PAVE copolymer, the VdF/HFP/TFE/PAVE composition is preferably 40-90/0-25/0-40/3-35, and is more preferably 40-80/3-25/3-40/3-25 mol %.

Moreover, from a different perspective, it is preferable for the fluorine-containing polymer to possess charge polarization within the molecule. When the fluorocompound used for surface-modified exhibits high polarity, or when the nanofiller is a layered substance that exhibits high polarity, the fluorine-containing polymer will possess charge polarization within the molecule, the fluorine-containing polymer will intercalate in the spaces between the layers in the layered structure of the surface-modified nanofiller as a result of the hybridization of the surface-modified nanofiller. The molecular chains constituted from the fluorine-containing polymer due to this hybridization will be bound by sheets derived from the surface-modified nanofiller, and the bond strength between the molecular chains will grow stronger. In addition, the sheets of clay minerals due to the hybridization will be uniformly finely dispersed within the fluorine-containing polymer. For this reason, if chemical products or fuels come into contact with the polymer composite material, the chemical products or fuels will be obstructed by these sheets, so that corrosion due to the chemical product or permeation by the fuel will occur only with difficulty. Consequently, the properties of the polymer composite materials that contain fluorine-containing polymers, such as substance permeability barrier properties and the like (for example, chemical resistance fuel barrier properties, and the like) with be further improved.

Additionally, the amount of fluorine in the abovementioned fluorine-containing polymers, based on 100 mass % of the fluorine-containing polymer, is preferably 10-90 mass %, but 30-90 mass % is more preferred, 50-90 mass % is still more preferred, and 50-80 mass % is the most preferred. By achieving a balance between improvements in the dispersibility of the surface-modified nanofiller and in the substance permeability barrier properties of the polymer itself, it is possible to provide a material that exhibits superior characteristics. Furthermore, when the fluorine content in the fluorine-containing polymer is less than 10 mass %, there are concerns that this might produce a reduction in the physical properties of the polymer itself such as its substance permeability barrier properties, and when the fluorine content exceeds 90 mass % it can produce a reduction in the processability.

For the abovementioned polymer, moreover, the weight average molecular weight is preferably 5,000-1,000,000, but is more preferably 10,000-1,000,000. If the weight average molecular weight is 5,000-1,000,000, it is possible to achieve a good balance between mechanical properties and processability. Furthermore, when the weight average molecular weight is <5,000 there is a reduction in the mechanical properties, and when it is >1,000,000 there is a decrease in the processability.

In addition, when a layered material as the surface-modified nanofiller is dispersed in the polymer, it is preferred for the molecular chains that constitute the polymer to intercalate between the layers of the layer structure that constitutes the surface-modified nanofiller. Through intercalation, the interface between the surface of the surface-modified nanofiller and the polymer becomes larger, and it becomes possible to obtain a relatively greater reinforcing effect of the polymer due to the surface-modified nanofiller. Furthermore, when this intercalation is produced, the interlayer distance of the layers that constitute the surface-modified nanofiller by the complexation of the polymer and the surface-modified nanofiller becomes broader than in the original state. Furthermore, the broadness of the interlayer distance can be continued by X-ray diffraction and the like. Additionally, the interlayer distance when intercalation occurs is preferably ≧5 Ångstroms broader compared to the interlayer distance before the intercalation was produced, but it is more preferred for the distance to be ≧30 Ångstroms broader compared to the interlayer distance before the intercalation was produced, and an interlayer distance of ≧100 Ångstroms broader compared to the interlayer distance before the intercalation was produced is even more preferred. As a result, the dispersibility of the surface-modified nanofiller is increased, the fraction of bound polymer will increase, and by increasing the reinforcing effect, it is possible to promote increases in the substance permeability barrier properties and mechanical properties. Furthermore, when the distance is smaller than 5 Ångstroms, there are concerns about the dispersibility of the clay mineral. Thus, furthermore, when the surface-modified nanofiller is dispersed in the polymer, it is preferable for the layered structure of the surface-modified nanofiller to eliminated and for the sheets that constitute a layered structure to become single layers and to become a molecular dispersion. In this way, the proportion of the molecular chains of the polymer that are bound by the surface-modified nanofiller will be maximized, and the reinforcing effect of the surface-modified nanofiller will be extremely large. For this reason, it will be possible to obtain the effect claimed in the present invention to a substantial extent. However, to the extent that the properties of the polymer composite material are not diminished, it is acceptable for the polymer composite material to have a layered state with multiple layers partly.

(B) Other Additives

In addition to the surface-modified nanofiller and polymers, it is acceptable for the abovementioned polymer composite material, moreover, to include additives such as crosslinking agents or filler materials.

(C) Mixing Ratios

In the abovementioned polymer composite material, the mixing ratio of surface-modified nanofiller and polymer, based on 100 parts by weight of the polymer, is preferably 0.01-300 parts by weight of the surface-modified nanofiller, more preferably 0.1-100 parts by weight, and most preferably 0.1-30 parts by weight. In this way, it is possible to promote a good balance between the improvement of properties such as substance permeability barrier properties and the like, and processability. Furthermore, when the amount of surface-modified nanofiller is <0.01 parts by weight, there are concerns that an improvement of properties such as substance permeability barrier properties and the like will not be realized, and if the amount is >300 parts by weight, there are concerns that the processability will be diminished.

(D) Manufacturing Methods

Preferred examples of methods to obtain the aforementioned polymer composite materials, to the extent that the surface-modified nanofillers and polymers will be contained without being limiting in any particular way, preferably include the method of mixing these same with, depending upon the requirements, any additives that are added. Representative examples of mixing methods include the dissolution method, the method of polymerization-type interlaminar introduction following introduction of the monomer, the method of polymer introduction-type interlaminar introduction, the method of secondary introduction-type nanocomposites and the like, but from the perspective of dispersibility and operating efficiency, the polymer introduction-type interlaminar introduction method is preferred.

(E) Molded Bodies

Furthermore, it is possible to form molded bodies of the polymer composite material of the present invention by the use of various molding methods such as injection molding, extrusion molding, press molding, blow molding, film molding and the like. In this way, a molded body (molded article) from the use of a polymer composite material of the present invention can also be said to be one of the preferred embodiments of the present invention.

(F) Applications

The polymer composite materials and molded articles of the present invention can be suitably used in the fields shown below:

In the related field of semiconductor manufacturing equipment, liquid crystal manufacturing device, plasma panel manufacturing device, plasma address liquid crystal panels, field emission display panels, solar battery substrates, and the like, examples include, O(square)-rings, packings, sealing materials, tubes, rollers, coatings, linings, gaskets, diaphragms, hoses and the like, and such items can be used in CVD equipment, dry etching equipment, wet etching equipment, oxidation diffusion equipment, sputtering equipment, ashing equipment, wet scrubbers, ion implantation equipment, air exhausters, tubes for chemicals, tubes for gases and the like. Specific examples include O-rings or sealing materials for gate bulbs, O-rings or sealing materials for quartz windows, O-rings or sealing materials for chambers, O-rings or sealing materials for gates, O-rings or sealing materials for bell jars, O-rings or sealing materials for couplings, O-rings, sealing materials or diaphragms for pumps, O-rings or sealing materials for gas control equipment used for semiconductors, O-rings or sealing materials used for resist developing solutions/pealing solutions, hoses or tubes used for wafer washing solutions, rollers used for wafer conveying, linings or coatings used in resist developing solution tanks/peeling solution tanks, linings or coatings used in wafer washing solution tanks, or linings or coatings used in wet etching tanks. Furthermore, they can be used in sealant/sealing agents, coatings for quartz optic fibers; electrical components aiming at insulation, vibration insulation, waterproofing or moisture-proofing for electrical components; potting, coatings and adhesive seals for circuit boards; gaskets for magnetic storage devices; modifiers for sealant materials such as epoxy and the like, sealants used for cleanrooms/clean facilities, and the like.

In the automotive field, gaskets, shaft seals, valve stem seals, sealing materials and hoses can be used in engines as well as peripheral equipment; hoses and sealing materials can be used for AT equipment; and O(square)-rings, tubes, packings, valve core materials, hoses, sealing materials and diaphragms can be used in the fuel system as well as in the peripheral equipment. Specific examples include engine head gaskets, metal gaskets, oil pan gaskets, crankshaft seals, cam shaft seals, valve stem seals, manifold packings, oil hoses, seals for oxygen sensors, ATF hoses, injector O-rings, injector packings, fuel pump O-rings, diaphragms, fuel hoses, crankshaft seals, gearbox seals, power piston packings, cylinder liner seals, valve stem seals, automatic transmission front pump seals, rear accelerator pinion seals, universal joint gaskets, speedometer pinion seals, foot brake piston cups, torque transmission O-rings, oil seals, exhaust gas afterburner equipment seals, bearing seals, EGR tubes, twin carb tubes, carburetor sensor diaphragms, vibration-proof rubbers (engine mounts, exhaust outlet and the like), afterburner hoses, oxygen sensor bushings and the like.

In the aircraft, rocket and marine vessel fields, examples include diaphragms, O(square)-rings, valves, tubes, packings, hoses, sealing materials and the like, and these can be used in fuel systems. Specific examples of these materials being used in the aircraft field include jet engine valve stem seals, fuel supply hoses, gaskets and O-rings, rotating shaft seals, gaskets for hydraulic equipment, seals for fire-resistant walls and the like; and in the marine vessel field, propeller shaft stern seals for screw, valve stem seals for use in diesel engine breathers, valve seals for butterfly valves, shaft seals for butterfly valves and the like.

In the field of the chemical product manufacturing such as plants and the like, examples include linings, valves, packings, rollers, hoses, diaphragms, O(square)-rings, tubes, sealing materials, chemical-resistant coatings and the like, and where in these can be used in chemical product manufacturing processes such as for drugs, agricultural chemicals, coatings, resins and the like. Specific examples include pumps used for chemical products, flowmeters, seals for piping, seals for heat exchangers, packings for glass condensers in sulfuric acid manufacturing equipment, agricultural chemical applicators, seals for agricultural chemical transfer pumps, seals for gas piping, seals used for plating liquids, packings for high temperature vacuum dryer systems, koroseals for belts used in paper manufacture, seals for fuel batteries, wind tunnel joint seals, trichloroethylene-resistant rollers (used in dyeing fibers), acid-resistant hoses (used for concentrated sulfuric acid), packings in tubing connector for gas chromatography or a pH meter, chlorine gas transfer hoses; water drain hoses for benzene and toluene storage tank catchment; seals, tubes, diaphragms and valve components for analyzers and physicochemical apparatus, and the like.

In the chemical products field including pharmaceutical products and the like, these materials can be used for chemical stoppers and the like.

In the photography field including developing equipment and the like, in the printing field including printing machinery and the like, in the coatings field including coating facilities and the like, examples include rollers and the like, and these can be used for film developing equipment/X-ray film developing equipment, printing rollers and coating rollers, respectively. Specific examples where these materials are used include coating rollers such as developing rollers for film developing equipment and X-ray film developing equipment, gravure rollers and guide rollers of printing rollers, gravure rollers of coating rollers in a magnetic tape coating production line, guide rollers for a magnetic tape coating production line, various coating rollers and the like. Furthermore, these materials can be used in seals for xerography equipment; printing rollers, scrapers, tubes, valve components for printing facilities; coating rollers, scrapers, tubes, valve components for coating or printing facilities, ink tubes, rollers and belts for printers, belts and rollers for xerography equipment, belts and rollers for printing equipment, and the like.

Moreover, these materials can be used in tubes in the analytical/physicochemical field.

In the field of food plant machines, examples include linings, valves, packings, rollers, hoses, diaphragms, O(square)-rings, tubes, sealing materials and belts and the like, and where in these can be used in food manufacturing processes. Specific examples of where these materials can be used include seals for plate-type heat exchangers, seals for solenoid valves in automatic vending machines and the like.

In the field of atomic energy plant equipment, examples include packings, O-rings, hoses, sealing materials, diaphragms, valves, rollers, tubes and the like.

In the iron and steel field including iron plate processing facilities and the like, examples include rollers and the like that can be used as rollers in the processing of iron plate and the like.

In the field of general industry, examples include packings, O-rings, hoses, sealing materials, diaphragms, valves, rollers, tubes, linings, mandrels, electrical wires, flexible joints, belts, rubber plates, weather-stripping; rollers, roller blades and belts for PPC copying equipment, and the like. Specific examples where these materials are used include seals for hydraulic or lubricating devices, bearing seals, seals for windows in dry cleaning equipment and other miscellaneous seals, seals for uranium hexafluoride enrichment equipment, valve seals (vacuum) for cyclotrons, seals for automated packaging machines, diaphragms (environmental pollution measurement devices) for pumps used in the analysis of sulfur dioxide gas and chlorine gas in the air; rollers, belts and squeeze rollers for use in acid cleaning for printing machines, and the like.

In the electrical field, specific examples include the use as insulating oil cups for bullet trains, benching seals for a liquid ring trance, and jackets for oil well cables.

In the fuel battery field, specific examples include the use in electrodes, seal materials between separators or on the seals for hydrogen/oxygen/water production pipes or the like.

In the electrical components field, specific examples include the use as a raw material for a thermal radiation material, a raw material for an electromagnetic wave shield material, modifiers for prepreg resin such as epoxy and the like for printed circuit boards, shatter-proof materials for electric bulbs, gaskets for the hard disk drive of a computer, and the like.

For the possible use in on-site construction-type molding, without being limiting in any particular way, examples that can be named include coating agents for metal gaskets used in automobile engines, gaskets for engine oil pans, rollers used in copying machines and printing machines, sealing agents for use in the construction field, gaskets for use in magnetic recording systems, sealing agents for filtering units used in cleanrooms, coating agents used in printed circuit boards, fixing agents for use in electrical/electronic components, an insulating moisture-proofing treatment for lead terminals in electrical devices, oven seals in electrical furnaces, terminal treatment for sheathed heaters, window-frame seal for an microwave, adhesives for CRT wedge and neck connectors, adhesives for automotive electrical components; masonry seals in kitchens, bathrooms and lavatories, and the like.

The molded articles of the present invention can be suitable for use in the various above-mentioned applications, and are particularly suitable as fuel peripheral components. Moreover, molded articles of the present invention are particularly useful as sealing materials, packings, rollers, tubes or hoses.

In addition, their utilization as conductive materials that possess superior surface resistance for capacitors and the like, as coating materials used for fuel battery separators, as antistatic materials for actuators, as piezoelectric composite materials for sensors, as conductive films and as conductive materials used for electrophotographic devices and the like is considered. Furthermore, it is necessary to impart electrical conductivity to the polymer composite materials in applications such as these.

Working examples and comparative examples are shown below to give more concrete explanations of the present invention, but these examples do not limit the present invention in any way. Furthermore, "%" has the meaning of "mass %" unless otherwise specified.

WORKING EXAMPLES

In the working examples below, heat resistance is evaluated according to the method given below.
Heat Resistance Evaluation Method Thermal analysis (TG/DTA) is used, and the heat resistance is evaluated for each test sample in the abovementioned working examples and comparative examples. Specifically, the TG/DTA is set up with a constant rate of temperature increase, and the temperature is increased up to a fixed temperature; the temperature for a 1% reduction in mass is determined from the measurement trace on the chart obtained at this time, and this is taken as the heat resistance of the surface-modified nanofiller.

Working Example 1

First, 4 g of sodium montmorillonite (Kunipia F, from Kunimine Industries) was weighed out, and this was dispersed in 400 mL of water at 80° C. Next, 4.2 g of $ICH_2CF_2CF_2OCF(CF_3)CONHCH_2CH_2NH_3{}^+Cl^-$ is weighed out, and after this was dissolved in 20 mL of water at 80° C., when this solution was added to the abovementioned montmorillonite aqueous dispersion, a precipitate was produced within the system. The precipitate obtained was filtered and was washed three times with water at 80° C. This resulted in montmorillonite organically-modified with $ICH_2CF_2CF_2OCF(CF_3)CONHCH_2CH_2NH_2$, that is, $ICH_2CF_2CF_2OCF(CF_3)CONHCH_2CH_2NH_2$—MMT (Test Sample 1) was obtained. The heat resistance of the Test Sample 1 obtained was determined according to the abovementioned method. The result was that the temperature for a 1% reduction in mass was 250° C. (see Table 1).

Working Example 2

First, 3 g of sodium montmorillonite (Kunipia F, from Kunimine Industries) was weighed out, and this was dispersed in a solvent mixture at 80° C. of 300 mL of water and 100 mL of acetone. Next, 3 g of $CF_3CF_2CF_2CF_2CH_2CH_2P(C_4H_9)_3{}^+I^-$ was weighed out, and after this was dissolved in a solvent mixture at 80° C. of 10 mL of water and 10 mL of acetone, when this solution was added to the abovementioned montmorillonite liquid dispersion, a precipitate was produced within the system. The precipitate obtained was filtered and was washed three times with water at 80° C. This resulted in montmorillonite organically-modified with $CF_3CF_2CF_2CF_2CH_2CH_2P(C_4H_9)_3$, that is, $CF_3CF_2CF_2CF_2CH_2CH_2P(C_4H_9)_3$—MMT (Test Sample 2) was obtained. The heat resistance of the Test Sample 2 obtained was determined according to the abovementioned method. The result was that the temperature for a 1% reduction in mass was 350° C. (see Table 1).

Working Example 3

First, 2.6 g of sodium montmorillonite (Kunipia F, from Kunimine Industries) was weighed out, and this was dispersed in 260 mL of water at 80° C. After 2 g of the $CF_3CF_2CF_2CF_2CH_2CH_2$—$Imi^+$-$I^-$ shown in Chemical Formula (22) was weighed out, and after this was dissolved in 20 mL of water at 80° C., when this solution was added to the abovementioned montmorillonite aqueous dispersion, a precipitate was produced within the system. The precipitate obtained was filtered and was washed three times with water at 80° C. This resulted in montmorillonite organically-modified with $CF_3CF_2CF_2CF_2CH_2CH_2$—Imi, that is, $CF_3CF_2CF_2CF_2CH_2CH_2$—Imi-MMT (Test Sample 3) was obtained. The heat resistance of the Test Sample 3 obtained was determined according to the abovementioned method. The result was that the temperature for a 1% reduction in mass was 350° C. (see Table 1).

Structure 12

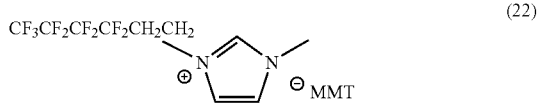

(22)

Working Example 4

In a synthetic quartz reaction vessel, 4 mg of perfluoroazooctane was dissolved in 4 mL of perfluorohexane, and carbon nanotube (HiPco single walled carbon nanotube, from CNI) was introduced into this solution. Under an argon atmosphere and with stirring, this was irradiated with a low pressure mercury lamp for a period of 8 hours at room temperature. Afterwards, the perfluorohexane was removed, the carbon nanotube was washed with perfluorohexane and hexane, and was then dried at reduced pressure. This resulted in carbon nanotube organically-modified with the perfluorooctyl group, that is, Rf—CNT (Test Sample 4) was obtained. Furthermore, the introduction of the perfluorooctyl group to the surface was confirmed by carrying out elemental analysis and IR measurements after the abovementioned reaction. The heat resistance of the Test Sample 4 obtained was determined according to the abovementioned method. The result was that the temperature for a 1% reduction in mass was 300° C. (see Table 1).

Working Example 5

First, 80 g of hydrotalcite (DHT-4A, from Kyowa Chemical Industries) was weighed out, and this was dispersed in 5,000 mL of water at 80° C. Next, after 28.5 g of $CF_3(CF_2)_7COO^-NH_4^+$ was weighed out and after this was dissolved in 2,000 mL of water at 80° C., when this solution was added to the abovementioned hydrotalcite aqueous dispersion, a precipitate was produced within the system. The precipitate obtained was filtered and was washed three times with water at 80° C. This resulted in hydrotalcite organically-modified with $CF_3(CF_2)_7COO$, that is, Rf—HTS (Test Sample 5) was obtained. The heat resistance of the Test Sample 5 obtained was determined according to the abovementioned method. The result was that the temperature for a 1% reduction in mass was 330° C. (see Table 1).

Working Example 6

To 30 mL of ethanol was added 51 mg of $HAuCl_4$ and 795 mg of 1H,1H,2H,2H-perfluorodecanethiol. Next, this solution was titrated with an aqueous solution of $NaBH_4$, and was stirred for a period of 3 hours. Afterward, this solution was filtered, and the filtered material was washed in an ultrasound bath with water, chloroform and ethanol. This resulted in Au organically-modified with 1H,1H,2H,2H-perfluorodecanethiol, that is, Rf—Au (Test Sample 6) was obtained. The heat resistance of Test Sample 6 obtained was determined according to the abovementioned method. The result was that the temperature for a 1% reduction in mass was 320° C. (see Table 1).

Working Example 7

First, 3 g of synthetic mica (ME-100, from Co-op Chemicals) was weighed out, and this was dispersed in a solvent mixture at 80° C. of 300 mL of water and 100 mL of acetone. Next, 3 g of $CF_3CF_2CF_2CF_2CH_2CH_2P(C_4H_9)_3^+I^-$ was weighed out, and after this was dissolved in a solvent mixture at 80° C. of 10 mL of water and 10 mL of acetone, when this solution was added to the abovementioned mica liquid dispersion, a precipitate was produced within the system. The precipitate obtained was filtered and was washed three times with water at 80° C. This resulted in synthetic mica organically-modified with $CF_3CF_2CF_2CF_2CH_2CH_2P(C_4H_9)_3$, that is, $CF_3CF_2CF_2CF_2CH_2CH_2P(C_4H_9)_3$—Mica (Test Sample 7) was obtained. The heat resistance of the Test Sample 7 obtained was determined according to the abovementioned method. The result was that the temperature for a 1% reduction in mass was 350° C. (see Table 1).

Comparative Example 1

First, 80 g of sodium montmorillonite (Kunipia F, from Kunimine Industries) was weighed out, and this was dispersed in 5,000 mL of water at 80° C. Next, 28.5 g of $ICH_2CH_2CH_2OCH(CH_3)CONHCH_2CH_2NH_3^+Cl^-$ is weighed out, and after this was dissolved in 2,000 mL of water at 80° C., when this solution was added to the abovementioned montmorillonite aqueous dispersion, a precipitate was produced within the system. The precipitate obtained was filtered and was washed three times with water at 80° C. This resulted in montmorillonite organically-modified with $ICH_2CH_2CH_2OCH(CH_3)CONHCH_2CH_2NH_2$, that is, $ICH_2CH_2CH_2OCH(CH_3)CONHCH_2CH_2NH_2$—MMT (Comparative Test Sample 1) was obtained. The heat resistance of the Comparative Test Sample 1 obtained was determined according to the abovementioned method. The result was that the temperature for a 1% reduction in mass was 250° C. (see Table 1).

Comparative Example 2

First, 80 g of sodium montmorillonite (Kunipia F, from Kunimine Industries) was weighed out, and this was dispersed in 5,000 mL of water at 80° C. Next, 28.5 g of $CH_3CH_2CH_2CH_2CH_2CH_2P(C_4H_9)_3^+I^-$ was weighed out, and after this was dissolved in 2,000 mL of water at 80° C., when this solution was added to the abovementioned montmorillonite aqueous dispersion, a precipitate was produced within the system. The precipitate obtained was filtered and was washed three times with water at 80° C. This resulted in montmorillonite organically-modified with $CH_3CH_2CH_2CH_2CH_2CH_2P(C_4H_9)_3$, that is, $CH_3CH_2CH_2CH_2CH_2CH_2P(C_4H_9)_3$—MMT (Comparative Test Sample 2) was obtained.

Comparative Example 3

First, 80 g of sodium montmorillonite (Kunipia F, from Kunimine Industries) was weighed out, and this was dispersed in 5,000 mL of water at 80° C. Next, 28.5 g of the $CH_3CH_2CH_2CH_2CH_2CH_2$—Imi$^+$-I$^-$ shown in Chemical Formula (23) was weighed out, and after this was dissolved in 2,000 mL of water at 80° C., when this solution was added to the abovementioned montmorillonite aqueous dispersion, a precipitate was produced within the system. The precipitate obtained was filtered and was washed three times with water at 80° C. This resulted in montmorillonite organically-modified with $CH_3CH_2CH_2CH_2CH_2CH_2$—Imi, that is, $CH_3CH_2CH_2CH_2CH_2CH_2$—Imi-MMT (Comparative Test Sample 3) was obtained. The heat resistance of the Comparative Test Sample 3 obtained was determined according to the abovementioned method. The result was that the temperature for a 1% reduction in mass was 300° C. (see Table 1).

Structure 13

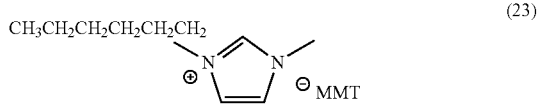

(23)

Comparative Example 4

In a synthetic quartz reaction vessel, 4 mg of azooctane was dissolved in 4 mL of hexane, and carbon nanotube (HiPco single walled carbon nanotube, from CNI) was introduced into this solution. Under an argon atmosphere and with stirring, this was irradiated with a low pressure mercury lamp for a period of 8 hours at room temperature. Afterwards, the hexane was removed, the carbon nanotube was washed with hexane, and was then dried at reduced pressure. This resulted in carbon nanotube organically-modified with the octyl group, that is, Rh—CNT (Comparative Test Sample 4) was obtained. Furthermore, the introduction of the octyl group to the surface was confirmed by carrying out elemental analysis and IR measurements after the abovementioned reaction. The heat resistance of the Comparative Test Sample 4 obtained was determined according to the abovementioned method. The result was that the temperature for a 1% reduction in mass was 250° C. (see Table 1).

Comparative Example 5

First, 80 g of hydrotalcite (DHT-4A, from Kyowa Chemical Industries) was weighed out, and this was dispersed in 5,000 mL of water at 80° C. Next, after 28.5 g of $CH_3(CH_2)_7COO^-NH_4^+$ was weighed out and after this was dissolved in 2,000 mL of water at 80° C., when this solution was added to the abovementioned hydrotalcite aqueous dispersion, a precipitate was produced within the system. The precipitate obtained was filtered and was washed three times with water at 80° C. This resulted in hydrotalcite organically-modified with $CH_3(CH_2)_7COO^-NH_4^+$, that is, Rh—HTS (Comparative Test Sample 5) was obtained. The heat resistance of the Comparative Test Sample 5 obtained was determined according to the abovementioned method. The result was that the temperature for a 1% reduction in mass was 240° C. (see Table 1).

Comparative Example 6

To 30 mL of ethanol was added 51 mg of $HAuCl_4$ and 300 mg of decanethiol. Next, this solution was titrated with an aqueous solution of $NaBH_4$, and was stirred for a period of 3 hours. Afterward, this solution was filtered, and the filtered material was washed in an ultrasound bath with water, chloroform and ethanol. This resulted in Au organically-modified with decanethiol, that is, Rh—Au (Comparative Test Sample 6) was obtained. The heat resistance of Comparative Test Sample 6 obtained was determined according to the abovementioned method. The result was that the temperature for a 1% reduction in mass was 220° C. (see Table 1).

Comparative Example 7

First, 3 g of synthetic mica (ME-100, from Co-op Chemicals) was weighed out, and this was dispersed in a solvent mixture at 80° C. of 300 mL of water and 100 mL of acetone. Next, 3 g of $CH_3CH_2CH_2CH_2CH_2CH_2P(C_4H_9)_3^+I^-$ was weighed out, and after this was dissolved in a solvent mixture at 80° C. of 10 mL of water and 10 mL of acetone, when this solution was added to the abovementioned mica liquid dispersion, a precipitate was produced within the system. The precipitate obtained was filtered and was washed three times with water at 80° C. This resulted in synthetic mica organically-modified with $CH_3CH_2CH_2CH_2CH_2CH_2P(C_4H_9)_3$, that is, $CH_3CH_2CH_2CH_2CH_2CH_2P(C_4H_9)_3$—Mica (Comparative Test Sample 7) was obtained. The heat resistance of the Comparative Test Sample 7 obtained was determined according to the abovementioned method. The result was that the temperature for a 1% reduction in mass was 250° C. (see Table 1). Comparison of the heat resistance of the surface-modified nanofillers that relate to the working examples and the comparative examples.

From the results of this evaluation, superior heat resistance was observed in Test Sample 3 to Comparative Test Sample 3, in Test Sample 4 to Comparative Test Sample 4, in Test Sample 5 to Comparative Test Sample 5, in Test Sample 6 to Comparative Test Sample 6 and in Test Sample 7 to Comparative Test Sample 7. Additionally, it became clear that Test Sample 1 and Comparative Test Sample 1 possessed the same heat resistance. In addition, it was clear that Test Sample 2 possessed heat resistance that was sufficiently high.

TABLE 1

| Test Sample No. | Temperature (° C.) for 1 wt % weight reduction | |
|---|---|---|
| | Test Sample | Comparative Test Sample |
| 1 | 250 | 250 |
| 2 | 350 | (Note 1) |
| 3 | 350 | 300 |
| 4 | 300 | 250 |
| 5 | 330 | 240 |
| 6 | 320 | 220 |
| 7 | 350 | 250 |

(Note 1): Not measured

Working Examples that Relate to Molded Bodies that Use Polymer Composite Materials In the working examples below, the physical properties of the molded bodies are evaluated according to the methods given below.

Methods for Evaluating the Physical Properties of Molded Bodies of the Polymer Composite Material (1) Method for Evaluating the State of Dispersion of the Surface-Modified Nanofiller in the Molded Body The state of dispersion of the surface-modified nanofiller in the molded body was evaluated by using an X-ray diffractometer (XRD) and a transmission electron microscopy (TEM). When the state of dispersion of the surface-modified nanofiller in the molded body was observed by transmission electron microscopy (TEM), ultrathin sections were cut from the molded body with a microtome, and these ultrathin sections were mounted in a Jeo 1-200CX (from JEOL Co. Ltd.).

(2) Method for Evaluating the Mechanical Properties of the Molded Body

A micro-dumbbell was punched out from the molded body as described in ASTM D 4895-94, to give the tensile test piece. The tensile test was carried out using the Autograph AG-300kNI (from Shimadzu Co. Ltd.) at a tensile rate of 50 mm/minute, and the strength, elastic modulus and the elongation were determined.

(3) Method for Evaluating the Fuel Permeation Barrier Properties of the Molded Body First, after fuel (CE10 (toluene/isooctane/ethanol=45/45/10 (v/v/v)) was poured into a stainless steel vessel fitted with a flange, with inner diameter 40 mm and height 20 mm (the volume of fuel was measured at this time), the opening of this stainless steel vessel and the flange were covered with a film sample of 0.5 mm in thickness. Next, a fluororubber O-ring that possessed a suitable diameter was placed over this film sample mounted on the flange of this vessel. Then, after a covering had placed over this O-ring, the vessel and the covering were fastened together with a screw to produce the permeation cell. Afterwards, this permeation cell was turned vertically upside down so that the film sample and the fuel were in contact, and this was allowed to stand in a temperature-controlled bath at 40° C. Then, at predetermined intervals the volume of fuel that remained in the stainless steel vessel was measured, and the fuel permeation coefficient [=((reduction in weight of fuel per unit time)×(average thickness of the film))/(permeation surface area)] was determined. Then, when the fuel permeation coefficient had reached a constant value, the measurements were terminated. In the present working examples, the fuel permeation coefficient for when it had reached a steady state like this was taken as the fuel permeation coefficient for this film sample.

(4) Method for Measuring Conductivity

The tensile test piece samples were freeze-fractured in liquid nitrogen, and test samples of 12.7 mm×1.9 mm×approx. 20 mm were prepared. Next, a conductive primer was applied to these fractured surfaces, and the resistance from one end of the test sample to its opposite end was measured. Then, the core conductivity was calculated by dividing the distance between these two coated surfaces (nominally 20 mm as a rule, but this was measured for each of the test samples) by the surface area of the coated surfaces and their resistance.

Synthesis Examples for the Fluorine-Containing Polymers

Synthesis Example 1

Into a 3,000 mL capacity pressure-resistant reactor was added 1,500 mL of purified water and 7.5 g of ammonium perfluorooctanoate, and after the internal atmosphere was replaced by filling with a gas mixture of VdF/HFP (mole ratio 45:55), the reactor was pressurized to 14 kg/cm$^2$(G). To this was introduced 0.3 mL of I(CF$_2$CF$_2$)$_2$I (25° C.), and this was stirred at 80° C. while 10 mL of a 0.2% aqueous solution of APS was injected. After a 0.5 hour induction period, a pressure drop occurred, hence when it dropped to 15 kg/cm$^2$(G), the vessel was repressurized to 15 kg/cm$^2$(G) with a gas mixture of VdF/HFP (mole ratio 78:22). Later, by this method, the polymerization continued within a pressure range of 13-15 kg/cm$^2$(G). After 20 hours, a rapid decline in temperature and pressure are applied to stop the polymerization. The concentration of solid matter in the dispersion produced was approx. 25%, and after coagulation with a 7% aqueous aluminum potassium sulfate solution, the product was washed and dried to yield a rubber with a iodine content of 0.13%. The polymer thus obtained is referred to below as Polymer A.

Synthesis Example 2

After 400 L of distilled water was placed in an autoclave and sufficient nitrogen substitution took place, 75 kg of 1-fluoro-1,1-dichloroethane, 190 kg of hexafluoropropylene and 1.5 kg of perfluoro(1,1,5-trihydro-1-pentene) are added into the autoclave, the system was maintained at 35° C. and the contents were stirred at a rate of stirring of 200 rpm. Afterwards, the system was pressurized up to 0.7 MPa with tetrafluoroethylene, and continuing further it was pressurized up to 10 kg/cm$^2$ with ethylene, after which 2.6 kg of di-n-propylperoxydicarbonate was injected to initiate the polymerization. As the pressure of the system decreased along with the progress in the polymerization, a gas mixture of tetrafluoroethylene/ethylene/hexafluoropropylene (mole percent of 40.5:42.5; 17.0) was supplied continuously, and the system pressure was maintained at 1.0 MPa and stirring was continued for 30 hours. Then, after the system was returned to atmospheric pressure, the reaction products were washed with water and dried to yield 178 kg of a powder. Next, a monoaxial extruder (VS50-24, from Tanabe Practice Kikai Co., Ltd.) was used to extrude the powder obtained with a cylinder temperature of 320° C. to yield pellets. The polymer thus obtained is referred to below as Polymer B.

Working Example 8

100 parts by weight of Polymer A and 1 part by weight of ICH$_2$CF$_2$CF$_2$OCF(CF$_3$)CONHCH$_2$CH$_2$NH$_2$—MMT (Test Sample 1) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Test Sample 8). The various properties for the molded body obtained were determined by the methods mentioned above. The results are shown in Table 2.

Working Example 9

100 parts by weight of Polymer A and 1 part by weight of CF$_3$CF$_2$CF$_2$CF$_2$CH$_2$CH$_2$P(C$_4$H$_9$)$_3$—MMT (Test Sample 2) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Test Sample 9). The various properties for the molded body obtained were determined by the methods mentioned above. The results are shown in Table 2.

Working Example 10

100 parts by weight of Polymer A and 1 part by weight of CF$_3$CF$_2$CF$_2$CF$_2$CH$_2$CH$_2$—Imi-MMT (Test Sample 3) were melted and kneaded using a biaxial extruder to prepare a polymer composite material. Furthermore, the kneading temperature was 150° C., and axle rotation rate was 50 rpm at this time. Then, based on 100 parts by weight of the polymer composite material, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Test Sample 10). The various properties for the molded body obtained were determined by the methods mentioned above. The results are shown in Table 2.

Working Example 11

100 parts by weight of Polymer A and 1 part by weight of Rf-CNT (Test Sample 4) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Test Sample 11). The various properties for the molded body obtained were determined by the methods mentioned above. The results are shown in Table 2.

Working Example 12

100 parts by weight of Polymer A and 1 part by weight of Rf-HTS (Test Sample 5) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Test Sample 12). The various properties for the molded body obtained were determined by the methods mentioned above. The results are shown in Table 2.

Working Example 13

100 parts by weight of Polymer A and 1 part by weight of Rf—Au (Test Sample 6) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Test Sample 13). The various properties for the molded body obtained were determined by the methods mentioned above. The results are shown in Table 2.

Working Example 14

100 parts by weight of Polymer A and 3 parts by weight of $CF_3CF_2CF_2CF_2CH_2CH_2P(C_4H_9)_3$—Mica (Test Sample 7) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Test Sample 14). The various properties for the molded body obtained were determined by the methods mentioned above. The results are shown in Table 2.

Working Example 15

100 parts by weight of Polymer A and 3 parts by weight of $CF_3CF_2CF_2CF_2CH_2CH_2P(C_4H_9)_3$—MMT (Test Sample 2) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Test Sample 15). The various properties for the molded body obtained were determined by the methods mentioned above. The results are shown in Table 2.

Working Example 16

100 parts by weight of Polymer B and 1 part by weight of $CF_3CF_2CF_2CF_2CH_2CH_2P(C_4H_9)_3$—MMT (Test Sample 2) were melted and kneaded using a biaxial extruder to prepare a polymer composite material. Furthermore, the kneading temperature was 210° C., and axle rotation rate was 80 rpm at this time. Then, the polymer composite material obtained was pressed with a hot-press at 190° C., to yield a molded body (Test Sample 16) The various properties for the molded body obtained were determined by the methods mentioned above. The results are shown in Table 2.

Comparative Example 8

100 parts by weight of Polymer A and 1 part by weight of $ICH_2CH_2CH_2OCH(CH_3)CONHCH_2CH_2NH_2$—MMT (Comparative Test Sample 1) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 1 part by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Comparative Test Sample 8). The various properties for the molded body obtained were determined by the methods mentioned above. The results are shown in Table 2.

Comparative Example 9

100 parts by weight of Polymer A and 1 part by weight of $CH_3CH_2CH_2CH_2CH_2CH_2P(C_4H_9)_3$—MMT (Comparative Test Sample 2) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Comparative Test Sample 9).

Comparative Example 10

100 parts by weight of Polymer A and 1 part by weight of $CH_3CH_2CH_2CH_2CH_2CH_2$—Imi-MMT (Comparative Test Sample 3) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Comparative Test Sample 10).

Comparative Example 11

100 parts by weight of Polymer A and 1 part by weight of Rh—CNT (Comparative Test Sample 4) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Comparative Test Sample 11). The various properties for the molded body obtained were determined by the methods mentioned above. The results are shown in Table 2.

Comparative Example 12

100 parts by weight of Polymer A and 1 part by weight of Rh—HTS (Comparative Test Sample 5) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Comparative Test Sample 12). The various properties for the molded body obtained were determined by the methods mentioned above. The results are shown in Table 2.

Comparative Example 13

100 parts by weight of Polymer A and 1 part by weight of Rh—Au (Comparative Test Sample 6) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Comparative Test Sample 13). The various properties for the molded body obtained were determined by the methods mentioned above. The results are shown in Table 2.

Comparative Example 14

100 parts by weight of Polymer A and 3 parts by weight of $CH_3CH_2CH_2CH_2CH_2CH_2P(C_4H_9)_3$—Mica (Comparative Test Sample 7) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Comparative Test Sample 14). The various properties for the molded body obtained were determined by the methods mentioned above. The results are shown in Table 2.

Comparative Example 15

100 parts by weight of Polymer A and 3 parts by weight of $CH_3CH_2CH_2CH_2CH_2CH_2P(C_4H_9)_3$—MMT (Comparative Test Sample 2) were melted and kneaded using a biaxial extruder to prepare a polymer composite material. Furthermore, the kneading temperature was 150° C., and axle rotation rate was 50 rpm at this time. Then, based on 100 parts by weight of the polymer composite material obtained, 4 parts by weight of a crosslinking agent (commercial product called TAIC, from Nippon Kasei Chemical Co., Ltd.), 1.5 parts by weight of peroxide (commercial product called Perhexa 25B, from NOF Corp.) and 20 parts by weight of carbon (from Cancarb) were added, and after these were mixed using a roller, crosslinking took place at 160° C. over a 10 min period while the mixture was being pressed with a hot-press, to yield a molded body (Comparative Test Sample 15). The various properties for the molded body obtained were determined by the methods mentioned above. The results are shown in Table 2.

Comparative Example 16

100 parts by weight of Polymer B and 1 part by weight of $CH_3CH_2CH_2CH_2CH_2CH_2P(C_4H_9)_3$—MMT (Comparative Test Sample 2) were melted and kneaded using a biaxial extruder to prepare a polymer composite material. Furthermore, the kneading temperature was 210° C., and axle rotation rate was 80 rpm at this time. Then, the polymer composite material obtained was pressed with a hot-press at 190° C., to yield a molded body (Comparative Test Sample 16) The various properties for the molded body obtained were determined by the methods mentioned above. The results are shown in Table 2.

Evaluation of the Various Properties of the Molded Bodies that Relate to the Working Examples and the Comparative Examples Evaluation of the State of Dispersion of the Surface-Modified Nanofiller in the Molded Body In the results above, it was clear that for each of the Test Samples 8-15, the surface-modified nanofiller was dispersed at the nano-level with respect to the fluorine-containing polymer. Moreover, it was clear that physical properties of Test Samples 8-15 were superior to those of the Comparative Test Samples 8-15. Additionally, the permeation coefficients for Test Samples 8-15 were lower than those of the Comparative Test Samples 8-15, and it was clear that Test Samples 8-15 were superior to the Comparative Test Samples 8-15 in terms of their fuel permeation barrier properties. In addition, Test Sample 11 was superior to Comparative Test Sample 11, and Test Sample 13 was superior to Comparative Test Sample 13, in terms of their conductivity.

By observing the above results, in the polymer composite materials of the working examples, the surface-modified nanofillers in the fluorine-containing polymers are considered to bind the molecular chains that constitute the fluorine-containing polymers. Thus, this is thought to be due chiefly to the polarity of the surface-modified nanofillers being high, and because the fluorine-containing polymers possess charge polarization. In other words, the fluorine-containing polymers intercalate between the layers that form the layered structure of the surface-modified nanofillers, and this is considered to be due to the fact that the surface-modified nanofillers are hybridized with the fluorine-containing polymers. Consequently, even though chemical products and fuel come into contact with the polymer composite materials, since the chemical products and fuel are obstructed by these surface-modified nanofillers, it is conjectured that corrosion due to the chemical product or permeation by the fuel will occur only with difficulty.

TABLE 2

| Test Sample No. | Compatibility | | Tensile strength MPa | | Modulus of elongation MPa | | Tensile elongation % | | Permeation coefficient g/mm/day·m$^2$ | | Electrical conductivity | |
|---|---|---|---|---|---|---|---|---|---|---|---|---|
| | Test Sample | Comparative Test Sample | Test Sample | Comparative Test Sample | Test Sample | Comparative Test Sample | Test Sample | Comparative Test Sample | Test Sample | Comparative Test Sample | Test Sample | Comparative Test Sample |
| 8 | ◎ | Δ | 13.4 | 11.6 | 1.0 | 0.8 | 558 | 555 | 49.2 | 52.3 | — | — |
| 9 | ◎ | X | 13.6 | — | 1.2 | — | 585 | — | 48.2 | — | — | — |
| 10 | ◎ | X | 24.6 | 15.0 | 2.6 | 1.4 | 562 | 372 | 29.7 | 39.0 | — | — |
| 11 | ◎ | X | 13.9 | 10.9 | 1.9 | 1.3 | 577 | 511 | 22.5 | 49.1 | ◎ | Δ |
| 12 | ◎ | X | 14.1 | 11.1 | 1.8 | 1.1 | 586 | 522 | 18.1 | 44.4 | — | — |
| 13 | ◎ | X | 13.9 | 11.3 | 2.2 | 1.4 | 584 | 521 | 24.1 | 48.5 | ○ | Δ |
| 14 | ◎ | X | 29.9 | 20.5 | 2.5 | 1.3 | 599 | 529 | 15.1 | 38.1 | — | — |
| 15 | ◎ | X | 30.1 | 20.2 | 2.5 | 1.4 | 632 | 534 | 13.1 | 36.4 | — | — |
| 16 | ○ | X | 13.7 | 11.1 | 956 | 991 | 271 | 240 | 10.1 | 15.1 | — | — |

Explanation of symbols
◎: Extremely good;
○: Good;
Δ: Somewhat inferior;
X: Unsatisfactory;
—: Not measured

INDUSTRIAL APPLICABILITY

Organically-modified clay mineral surface-modified nanofillers that relate to the present invention can impart superior heat resistance, substance permeation barrier properties, flame retardant properties, electrical conductivity and the like to polymers, and in addition to fuel tubes, can provide polymer composite materials for use in a variety of other applications. Moreover, polymer composite materials that relate to the present invention have superior heat resistance, mechanical properties, substance permeation barrier properties, flame retardant properties, electrical conductivity and the like, and in addition to fuel tubes, can be utilized in a variety of other applications.

What is claimed is:

1. A polymer composite material that contains
a nanofiller,
a fluorocompound that is bonded to the surface of the nanofiller, and
a polymer,
the nanofiller being a metal heteroatom compound, which is a clay mineral,
the fluorocompound being an organic ion that possesses a fluorine-containing alkyl group of from 1 to 50 carbon atoms and that contains heteroatoms.

2. The polymer composite material described in claim 1, wherein
the organic ion has the structure represented by Generic Formula (1) shown below;

  (1)

(where in the formula, $L^1$ is P, N, S, Si, O, Se, Te, As, Sb, Bi, F, Cl, Br or I; s is a value determined according to the valence of atom $L^1$ and is 2, 3, 4 or 5; $R^1$ can be the same or different and can be any one of "a hydrogen atom", "an alkyl group that optionally contains heteratoms and that can optionally be substituted in part by fluorine atoms", and "a fluorine-containing alkyl group of from 1 to 50 carbon atoms that contains heteroatoms", and can optionally be bonded to each other, but at least one $R^1$ is a fluorine-containing alkyl group of from 1 to 50 carbon atoms that contains heteroatoms); or has the structure represented by Generic Formula (2) shown below;

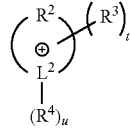  (2)

(where in the formula, $L^2$ is P, N, S, Si, O, Se, Te, As, Sb, Bi, F, Cl, Br or I; $R^2$ is "an alkylene group that optionally contains heteroatoms and unsaturated bonds and that can optionally be substituted in part by fluorine atoms", or "a chain group that is constituted from atoms other than carbon and that optionally contains unsaturated bonds"; t is a number that is less than or equal to the number of atoms that constitute the chain portion of $R^2$; u is an integral number from 0 to 3 that is determined according to the valence of $L^2$; $R^3$ and $R^4$ can be the same or different and can be any one of "a hydrogen atom", "an alkyl group that optionally contains heteroatoms and that can optionally be substituted in part by fluorine atoms", "and a fluorine-containing alkyl group of from 1 to 50 carbon atoms that contains heteroatoms", but at least one from among $R^3$ and $R^4$ is a fluorine-containing alkyl group of from 1 to 50 carbon atoms that contains heteroatoms).

3. The polymer composite material described in Claim 1, wherein
the organic ion is at least one type selected from the group consisting of organic ammonium ions, organic phosphonium ions and nitrogen-containing heterocyclic onium ions.

4. The polymer composite material described in claim 1, wherein the fluorine-containing alkyl group has from 4 to 50 carbon atoms.

5. The polymer composite material described in claim 1, wherein the polymer is a fluorine-containing polymer.

6. A molded article that comprises polymer composite materials described in claim 1.

7. A surface-modified nanofiller that includes
a clay mineral, and
a fluorocompound bonded to the surface of the clay mineral (except for an organic ammonium ion),
the fluorocompound being an organic ion that is at least one of an organic phosphonium ion and a nitrogen-containing heterocyclic onium ion, and possessing a fluorine-containing alkyl group of from 1 to 50 carbon atoms that contains heteroatoms.

8. The surface-modified nanofiller described in claim 7, wherein
the organic ion has the structure represented by Generic Formula (1) shown below;

(where in the formula, $L^1$ is P, N, S, Si, O, Se, Te, As, Sb, Bi, F, Cl, Br or I; s is a value determined according to the valence of atom $L^1$ and is 2, 3, 4 or 5; $R^1$ can be the same or different and can be any one of "a hydrogen atom", "an alkyl group that optionally contains heteroatoms and that can optionally be substituted in part by fluorine atoms", and "a fluorine-containing alkyl group of from 1 to 50 carbon atoms that contains heteroatoms", and can optionally be bonded to each other, but at least one $R^1$ is a fluorine-containing alkyl group of from 1 to 50 carbon atoms that contains heteroatoms); or has the structure represented by Generic Formula (2) shown below;

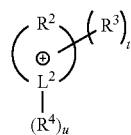

(where in the formula, $L^2$ is P, N, S, Si, O, Se, Te, As, Sb, Bi, F, Cl, Br or I; $R^2$ is "an alkylene group that optionally contains heteroatoms and unsaturated bonds and that can optionally be substituted in part by fluorine atoms", or "a chain group that is constituted from atoms other than carbon and that optionally contains unsaturated bonds"; t is a number that is less than or equal to the number of atoms that constitute the chain portion of $R^2$; u is a integral number from 0 to 3 that is determined according to the valence of $L^2$; $R^3$ and $R^4$ can be the same or different and can be any one of "a hydrogen atom", "an alkyl group that optionally contains heteroatoms and that can optionally be substituted in part by fluorine atoms", and "a fluorine-containing alkyl group of from 1 to 50 carbon atoms that contains heteroatoms", but at least one from among $R^3$ and $R^4$ is a fluorine-containing alkyl group of from 1 to 50 carbon atoms that contains heteroatoms).

9. The surface-modified nanofiller described in claim 7, wherein
the fluorine-containing alkyl group has from 4 to 50 carbon atoms.

10. A polymer composite material that contains a surface-modified nanofiller that includes
a clay mineral, and
a fluorocompound bonded to the surface of the clay mineral (except for an organic ammonium ion); and a polymer,
the fluorocompound being an organic ion that is at least one of an organic phosphonium ion and a nitrogen-containing heterocyclic onium ion, and possessing a fluorine-containing alkyl group of from 1 to 50 carbon atoms that contains heteroatoms.

11. The polymer composite material described in claim 10, wherein the organic ion has the structure represented by Generic Formula (1) shown below;

(where in the formula, $L^1$ is P, N, S, Si, O, Se, Te, As, Sb, Bi, F, Cl, Br or I; s is a value determined according to the valence of atom $L^1$ and is 2, 3, 4 or 5; $R^1$ can be the same or different and can be any one of "a hydrogen atom", "an alkyl group that optionally contains heteroatoms and that can optionally be substituted in part by fluorine atoms", and "a fluorine-containing alkyl group of from 1 to 50 carbon atoms that contains heteroatoms", and can optionally be bonded to each other, but at least one $R^1$ is a fluorine-containing alkyl group of from 1 to 50 carbon atoms that contains heteroatoms); or has the structure represented by Generic Formula (2) shown below;

(where in the formula, $L^2$ is P, N, S, Si, O, Se, Te, As, Sb, Bi, F, Cl, Br or I; $R^2$ is "an alkylene group that optionally contains heteroatoms and unsaturated bonds and that can optionally be substituted in part by fluorine atoms", or "a chain group that is constituted from atoms other than carbon and that optionally contains unsaturated bonds"; t is a number that is less than or equal to the number of atoms that constitute the chain portion of $R^2$; u is an integral number from 0 to 3 that is determined according to the valence of $L^2$; $R^3$ and $R^4$ can be the same or different and can be any one of "a hydrogen atom", "an alkyl group that optionally contains heteroatoms and that can optionally be substituted in part by fluorine atoms", "and a fluorine-containing alkyl group of from 1 to 50 carbon atoms that contains heteroatoms", but at least one from among $R^3$ and $R^4$ is a fluorine-containing alkyl group of from 1 to 50 carbon atoms that contains heteroatoms).

12. The polymer composite material described in claim 10, wherein the fluorine-containing alkyl group has from 4 to 50 carbon atoms.

13. The polymer composite material described in claim 10, wherein the polymer is a fluorine-containing polymer.

14. A molded article that comprises polymer composite materials described in claim 10.

* * * * *

UNITED STATES PATENT AND TRADEMARK OFFICE
CERTIFICATE OF CORRECTION

PATENT NO. : 7,989,535 B2
APPLICATION NO. : 11/993446
DATED : August 2, 2011
INVENTOR(S) : Hideto Nakagawa et al.

It is certified that error appears in the above-identified patent and that said Letters Patent is hereby corrected as shown below:

Column 2,
Line 21, "optionally contains heteratoms" should read -- optionally contains heteroatoms --;
Line 51, "optionally contains heteratoms" should read -- optionally contains heteroatoms --;

Column 3,
Line 39, "optionally contains heteratoms" should read -- optionally contains heteroatoms --;

Column 4,
Line 1, "that optionally contains heteratoms" should read -- that optionally contains heteroatoms --;

Column 7,
Line 65, "optionally contains heteratoms" should read -- optionally contains heteroatoms --;

Column 8,
Line 28, "an alkyl group that optionally contains heteratoms" should read -- an alkyl group that optionally contains heteroatoms --;

Column 38,
Line 5, "optionally contains heteratoms" should read -- optionally contains heteroatoms --;
Line 54, "atom", "an alkyl group that optionally contains heteratoms" should read -- atom", "an alkyl group that optionally contains heteroatoms --;

Column 39,
Line 26, "optionally contains heteratoms" should read -- optionally contains heteroatoms --;

Column 40,
Line 20, "optionally contains heteratoms" should read -- optionally contains heteroatoms --; and
Line 46, "atom", "an alkyl group that optionally contains heteratoms" should read -- atom", "an alkyl group that optionally contains heteroatoms --.

Signed and Sealed this
Eighth Day of November, 2011

David J. Kappos
*Director of the United States Patent and Trademark Office*